(12) United States Patent
Iguchi et al.

(10) Patent No.: US 10,742,823 B2
(45) Date of Patent: Aug. 11, 2020

(54) IMAGE PROCESSING APPARATUS AND IMAGE PROCESSING METHOD

(71) Applicant: CANON KABUSHIKI KAISHA, Tokyo (JP)

(72) Inventors: Ryosuke Iguchi, Inagi (JP); Shinjiro Hori, Yokohama (JP); Hiroyasu Kunieda, Yokohama (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 15/825,139

(22) Filed: Nov. 29, 2017

(65) Prior Publication Data

US 2018/0167521 A1   Jun. 14, 2018

(30) Foreign Application Priority Data

Dec. 9, 2016   (JP) ................. 2016-239781

(51) Int. Cl.
| | |
|---|---|
| *H04N 1/00* | (2006.01) |
| *G06K 9/00* | (2006.01) |
| *G06F 16/583* | (2019.01) |
| *H04N 1/387* | (2006.01) |
| *G06T 11/60* | (2006.01) |
| *H04L 29/08* | (2006.01) |
| *G05B 17/02* | (2006.01) |

(52) U.S. Cl.
CPC ....... *H04N 1/00185* (2013.01); *G06F 16/583* (2019.01); *G06K 9/00288* (2013.01); *G06T 11/60* (2013.01); *H04N 1/00196* (2013.01); *H04N 1/00411* (2013.01); *H04N 1/00413* (2013.01); *H04N 1/00482* (2013.01); *H04N 1/387* (2013.01); *G05B 17/02* (2013.01); *H04L 67/02* (2013.01)

(58) Field of Classification Search
CPC ........... H04N 1/00185; H04N 1/00411; H04N 1/00482; H04N 1/00413; H04N 1/00196; H04N 1/387; G06T 11/60; G06F 16/583; G06K 9/00288; G05B 17/02; H04L 67/02
See application file for complete search history.

(56) References Cited

U.S. PATENT DOCUMENTS

| | | |
|---|---|---|
| 7,006,668 B2 | 2/2006 | Iguchi et al. |
| 7,167,205 B2 | 1/2007 | Akiyama et al. |
| 7,738,030 B2 | 6/2010 | Akiyama et al. |

(Continued)

FOREIGN PATENT DOCUMENTS

JP        2015-089112 A        5/2015

*Primary Examiner* — John W Lee
(74) *Attorney, Agent, or Firm* — Venable LLP

(57) ABSTRACT

An image processing apparatus includes an obtaining unit to obtain a plurality of images, a setting unit to set a first priority mode for a first page if the number of images including an object corresponding to the first priority mode among a plurality of images assigned to a first page is greater than the number of images including an object corresponding to the second priority mode among the plurality of images and set a second priority mode for a second page if the number of images including the object corresponding to the first priority mode among a plurality of images assigned to the second page is less than the number of images including the object corresponding to the second priority mode among the plurality of images.

18 Claims, 23 Drawing Sheets

(56) References Cited

U.S. PATENT DOCUMENTS

| | | |
|---|---|---|
| 8,600,154 B2 | 12/2013 | Umeda et al. |
| 8,675,249 B2 | 3/2014 | Umeda et al. |
| 8,929,681 B2 | 1/2015 | Umeda et al. |
| 9,036,205 B2 | 5/2015 | Umeda et al. |
| 9,088,753 B2 | 7/2015 | Akiba et al. |
| 9,189,681 B2 | 11/2015 | Kunieda et al. |
| 9,214,027 B2 | 12/2015 | Sumi et al. |
| 9,275,270 B2 | 3/2016 | Suwa et al. |
| 9,406,158 B2 | 8/2016 | Yamaji |
| 9,569,831 B2 | 2/2017 | Song et al. |
| 9,594,534 B2 | 3/2017 | Sasaki et al. |
| 9,602,691 B2 | 3/2017 | Miyake et al. |
| 9,648,198 B2 | 5/2017 | Ishida et al. |
| 9,769,380 B2 | 9/2017 | Iguchi et al. |
| 2013/0145307 A1* | 6/2013 | Kawasaki ............ G06F 3/04886 715/781 |
| 2014/0013213 A1 | 1/2014 | Kajiwara et al. |
| 2015/0086116 A1* | 3/2015 | Yamaji ................ G06K 9/00684 382/190 |
| 2017/0039427 A1 | 2/2017 | Yamamoto et al. |
| 2017/0039746 A1 | 2/2017 | Mizoguchi et al. |

\* cited by examiner

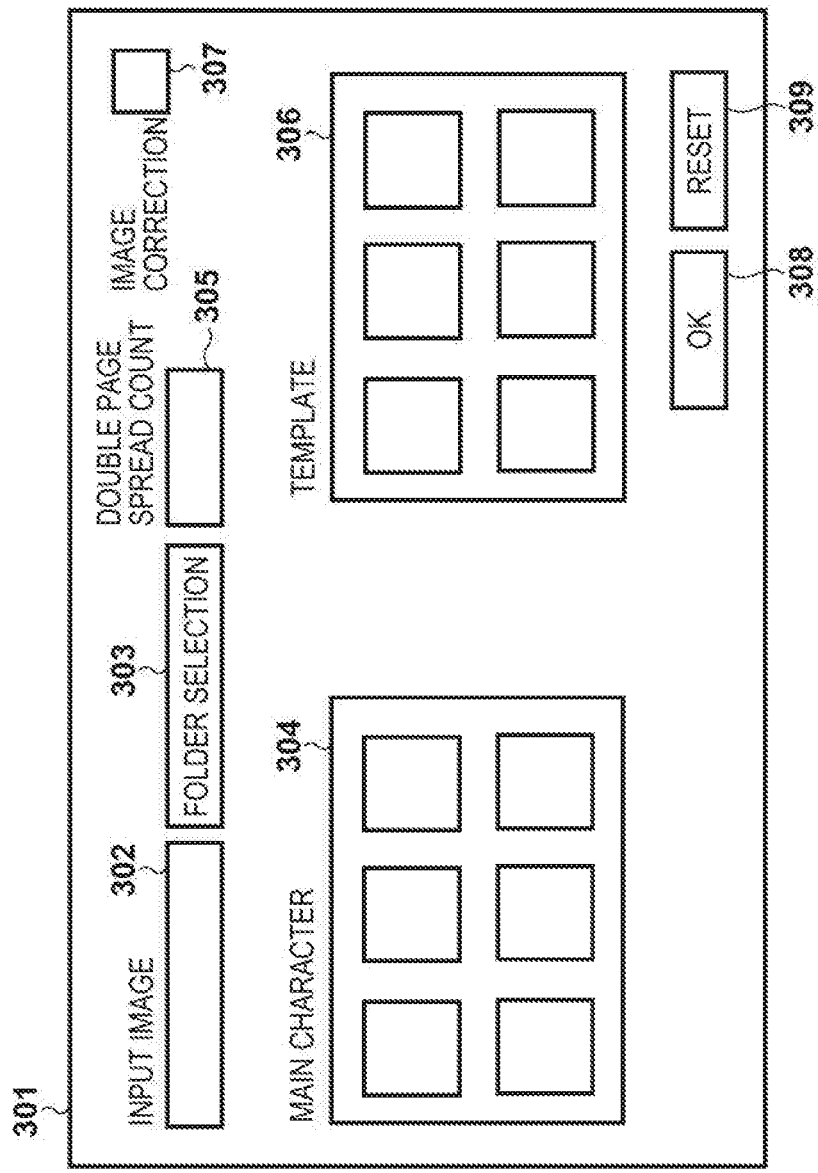

FIG. 5

| IMAGE ID | SHOOTING DATE/TIME | FOCUS | NUMBER OF FACES | PERSONAL ID | | | | | | | |
|---|---|---|---|---|---|---|---|---|---|---|---|
| | | | | 1 | | 2 | | 3 | | ... | |
| | | | | UPPER LEFT POSITION | LOWER RIGHT POSITION | UPPER LEFT POSITION | LOWER RIGHT POSITION | UPPER LEFT POSITION | LOWER RIGHT POSITION | | |
| 1 | 2015/7/1 10h11m12s | ○ | 6 | 40, 40 | 65, 65 | 90, 40 | 115, 65 | 10, 20 | 25, 35 | ... | |
| 2 | 2015/7/1 10h12m30s | ○ | 2 | 50, 100 | 100, 150 | 150, 125 | 190, 165 | 150, 125 | 190, 165 | ... | |
| 3 | 2015/7/1 10h15m54s | ○ | 0 | - | - | - | - | - | - | ... | |
| ... | ... | ... | ... | ... | ... | ... | ... | ... | ... | ... | |

FIG. 7

| SCENE | SHOOTING PERIOD (TIME) | | NUMBER OF SHOT IMAGES | | NUMBER OF SHOT PEOPLE | |
|---|---|---|---|---|---|---|
| | AVERAGE | STANDARD DEVIATION | AVERAGE | STANDARD DEVIATION | AVERAGE | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE OF MAIN SLOT | IMAGE FEATURE OF SUB-SLOT |
|---|---|---|
| TRIP | LONG SHOT IMAGE INCLUDING PERSON AND SCENERY | CLOSE-UP IMAGE OR IMAGE OF FACE IN PROFILE |
| DAILY LIFE | CLOSE-UP IMAGE OR IMAGE OF FACE IN PROFILE | LONG SHOT IMAGE INCLUDING PERSON AND SCENERY |
| CEREMONY | IMAGE INCLUDING TWO PEOPLE CLOSE TO EACH OTHER | IMAGE OF MANY PEOPLE |

FIG. 8B

| IMAGE ID | SCORE (MAXIMUM OF 50 POINTS) | | |
|---|---|---|---|
| | MAIN SLOT (POINTS) | SUB-SLOT (POINTS) | SUB-SLOT (POINTS) |
| 1 | 20 | 40 | 30 |
| 2 | 45 | 10 | 25 |
| 3 | 10 | 20 | 15 |
| ... | ... | ... | ... |

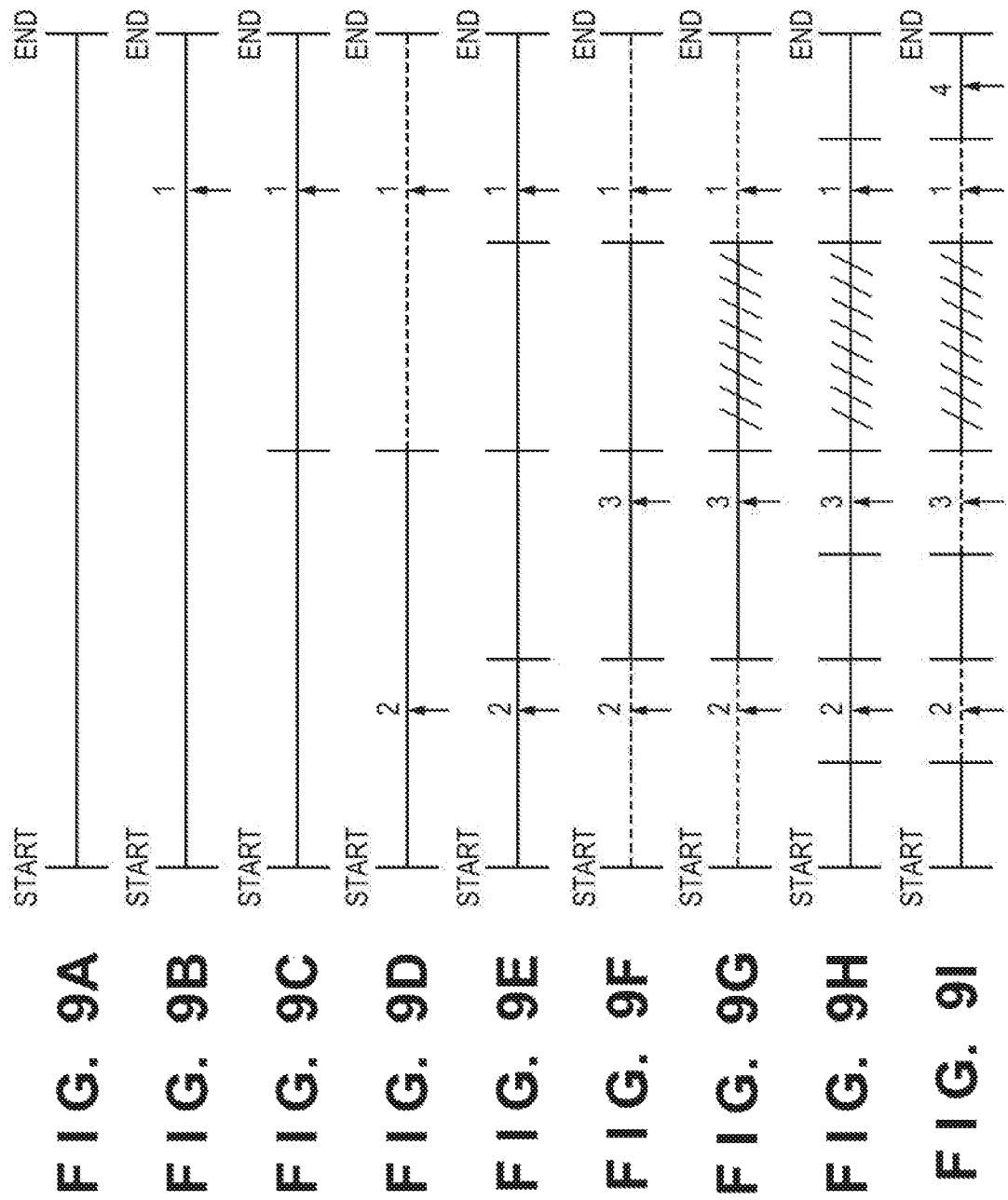

F I G. 10A
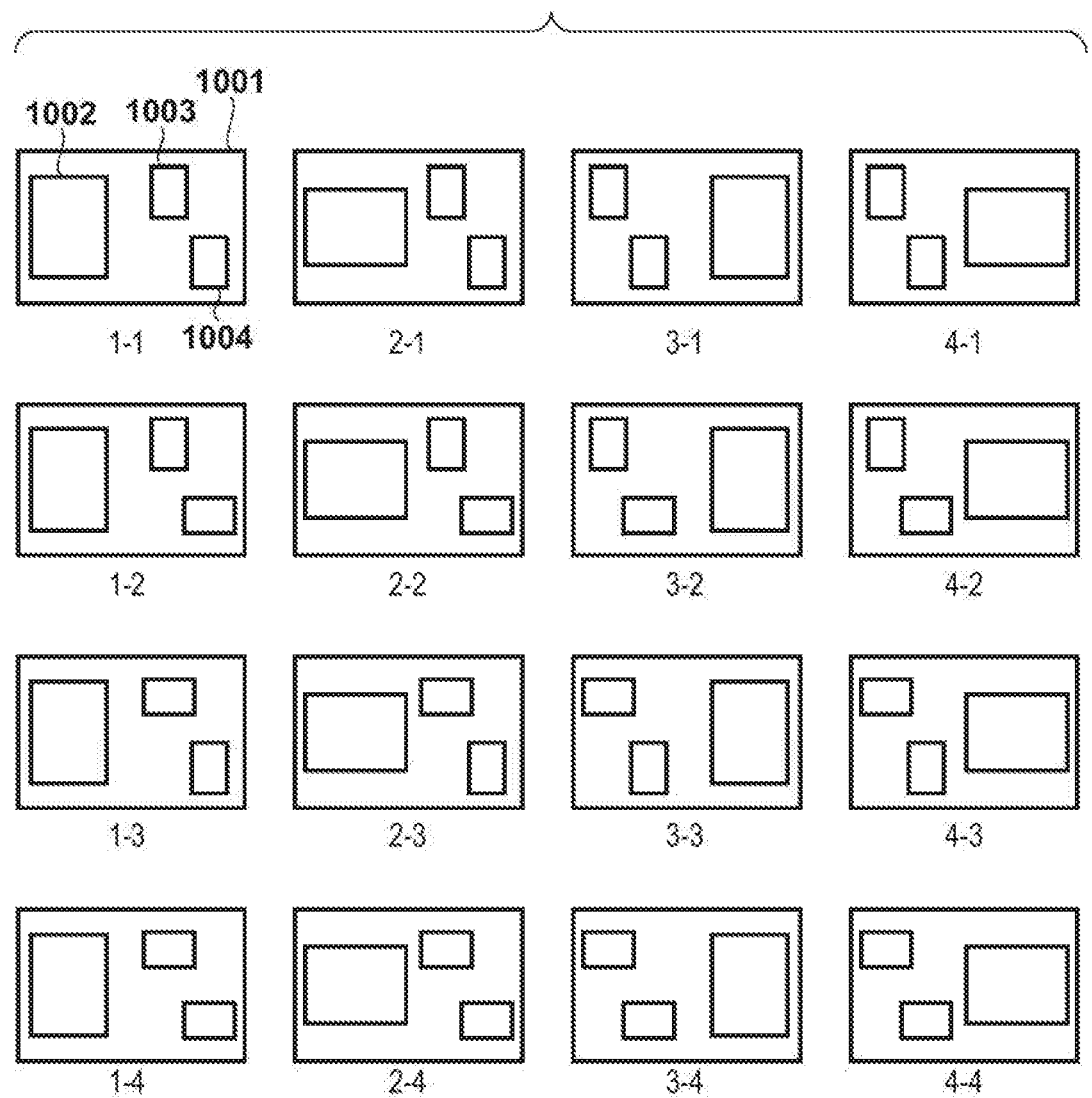
F I G. 10B
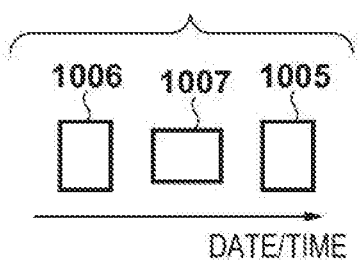

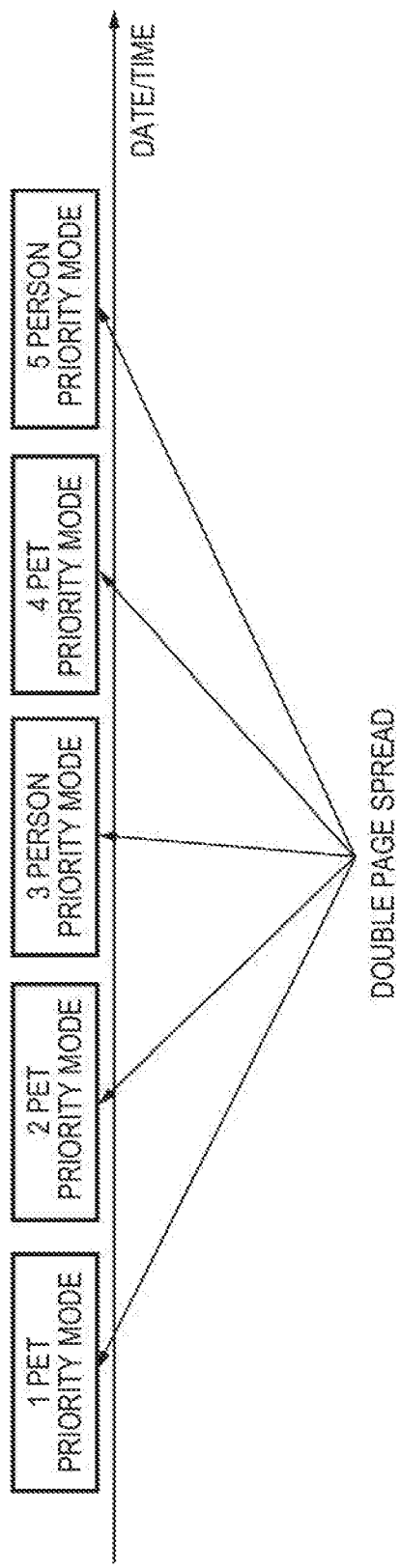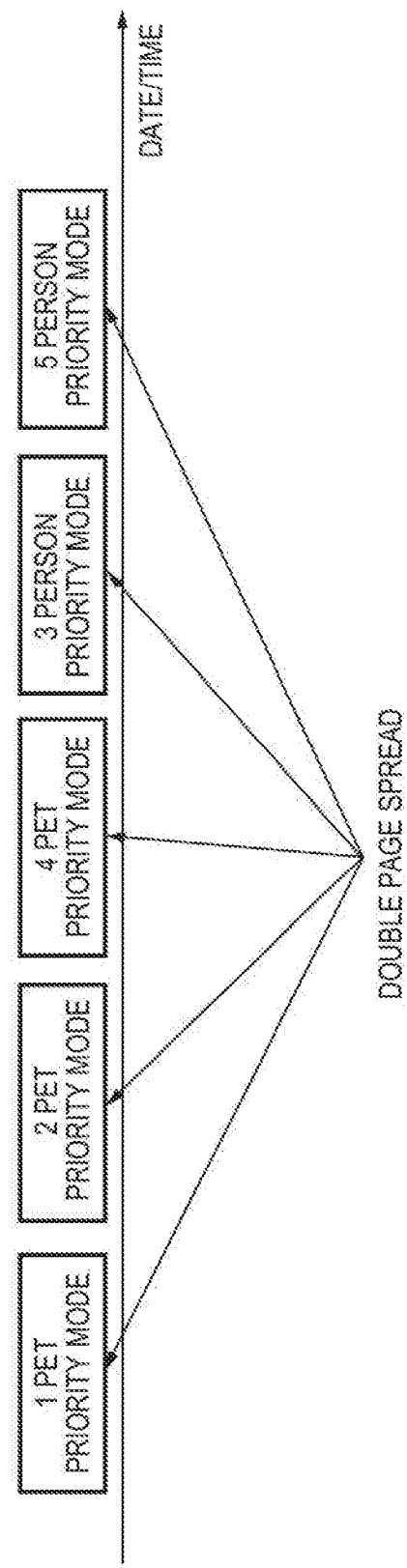

IMAGE PROCESSING APPARATUS AND IMAGE PROCESSING METHOD

BACKGROUND OF THE INVENTION

This application claims the benefit of Japanese Patent Application No. 2016-239781, filed Dec. 9, 2016, which is hereby incorporated by reference herein in its entirety.

FIELD OF THE INVENTION

The present invention relates to an image processing apparatus and an image processing method.

DESCRIPTION OF THE RELATED ART

In recent years, there has been provided an album creation service having an automatic layout function of encouraging the effective use of a large amount of image data. Automatic layout indicates that some or all of functions associated with album creation are automatically processed. Examples of the functions are a function of automatically selecting images to be laid out in an album, a function of automatically deciding a template to be used for the album, and a function of automatically assigning images to the template. The automatic layout function allows the user to quickly create an album, and can also be used as a creation guideline when creating an ideal album.

Especially, with respect to automatic selection of images, the user desirably designates a subject to select images each including the subject. If, for example, the user wants to set a specific person as a main subject of an album, he/she designates that person to automatically select the designated person from a large amount of input image data. On the other hand, if the user wants to set a pet dog as a main subject, he/she designates the pet dog to automatically select the designated pet dog in the same manner.

For example, Japanese Patent No. 5936658 describes a technique of analyzing an image group, discriminating a theme based on analysis information, selecting a template for creating a recommended composite image, and creating a recommended composite image to be laid out on each template.

However, in the technique described in Japanese Patent No. 5936658, only a template is set in accordance with the discriminated theme. Japanese Patent No. 5936658 does not describe switching of image selection processing from an intermediate page when there exists a plurality of pages like an album. In this case, an album including a small change over the plurality of pages may be created, and it may thus be impossible to create an album desired by the user.

SUMMARY OF THE INVENTION

According to one aspect, the present invention provides an image processing apparatus comprising an obtaining unit configured to obtain a plurality of images, a setting unit configured to set a first priority mode for a first page and set a second priority mode for a second page, and a selection unit configured to select an image including an object corresponding to the first priority mode for the first page from the plurality of images and select an image including an object corresponding to the second priority mode for the second page from the plurality of images, in accordance with a priority mode set by the setting unit.

According to another aspect, the present invention provides an image processing method comprising obtaining a plurality of images, setting a first priority mode for a first page and setting a second priority mode for a second page, and selecting an image including an object corresponding to the first priority mode for the first page from the plurality of images and selecting an image including an object corresponding to the second priority mode for the second page from the plurality of images, in accordance with a priority mode set in the setting.

According to the present invention, it is possible to create an album including a wide range of variations for each page.

Further features of the present invention will become apparent from the following description of exemplary embodiments (with reference to the attached drawings).

BRIEF DESCRIPTION OF THE DRAWINGS

FIG. 3 is a view showing an example of the arrangement of the user interface (UI) of the application according to the first embodiment;

FIG. 5 is a table showing an example of the structure of image analysis information according to the preset invention;

FIG. 7 is a table for explaining scene classification according to the present invention;

FIGS. 8A and 8B are tables for explaining image scoring according to the present invention;

FIGS. 9A to 9i are views for explaining image selection according to the present invention;

FIGS. 10A and 10B are views for explaining an image layout according to the present invention;

FIGS. 15A and 15B are views for explaining interchanging of double page spreads according to the present invention;

DESCRIPTION OF THE EMBODIMENTS

First Embodiment

This embodiment will describe a procedure of operating an album creation application (app) on an image processing apparatus, and automatically generating a layout.

[System Arrangement]

Figure 1:
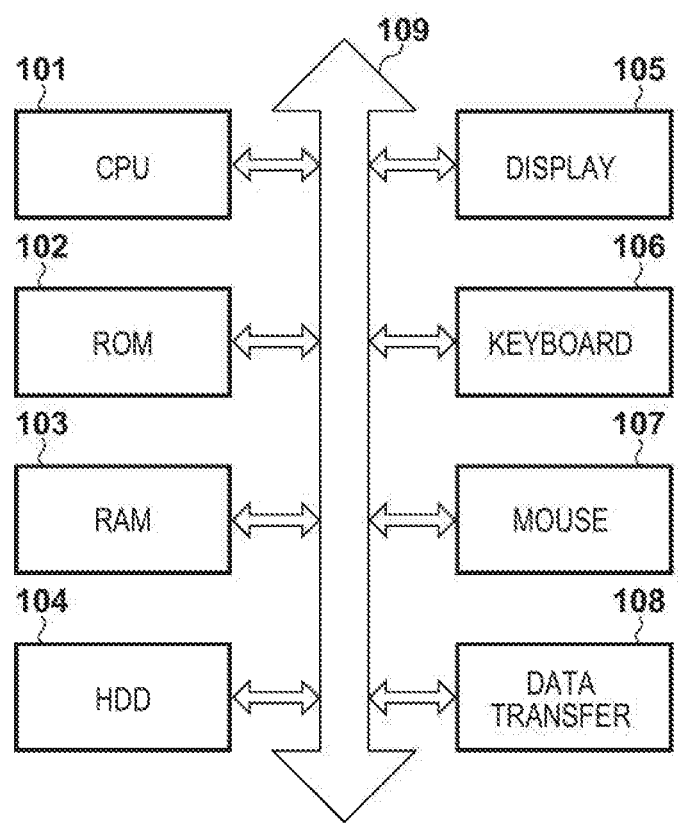
FIG. 1 is a block diagram showing an example of a hardware arrangement capable of executing an application according to the present invention.

FIG. 1 is a block diagram for explaining an example of the hardware arrangement of an image processing apparatus according to the present invention. Note that an example of the image processing apparatus is an information processing apparatus such as a PC (Personal Computer) or smartphone. This embodiment assumes a PC. Referring to FIG. 1, a CPU (Central Processing Unit/Processor) 101 executes an image processing method to be described in this embodiment in accordance with a program. Note that FIG. 1 shows one CPU. However, even if a plurality of CPUs are provided, they are shown as part of the CPU in this embodiment.

A ROM 102 stores a program to be executed by the CPU 101. A RAM 103 provides a memory for temporarily storing various kinds of information at the time of execution of a program by the CPU 101. An HDD (Hard Disk) 104 is a storage medium for storing a database that holds image files and processing results of image analysis, and the like. A display 105 is a device that presents a UI (user interface) of this embodiment and the layout result of images to the user. The display 105 may have a touch sensor function. A keyboard 106, for example, is used to input a double page spread count of an album to be created on the UI displayed on the display 105. The double page spread count corresponds to the number of double page spreads of a book.

A mouse 107, for example, is used by the user to perform an operation on the UI displayed on the display 105. For example, the user clicks a button by operating the mouse 107. A data transfer device 108 transmits automatic layout data to an external apparatus (for example, a printer or server) connected to the PC. A data bus 109 connects the above-described units to the CPU 101. The album creation application according to the present invention is saved as a program and data in the HDD 104. The album creation application is activated when the user double-clicks, using the mouse 107, the icon of the application displayed on the display 105.

Figure 2:
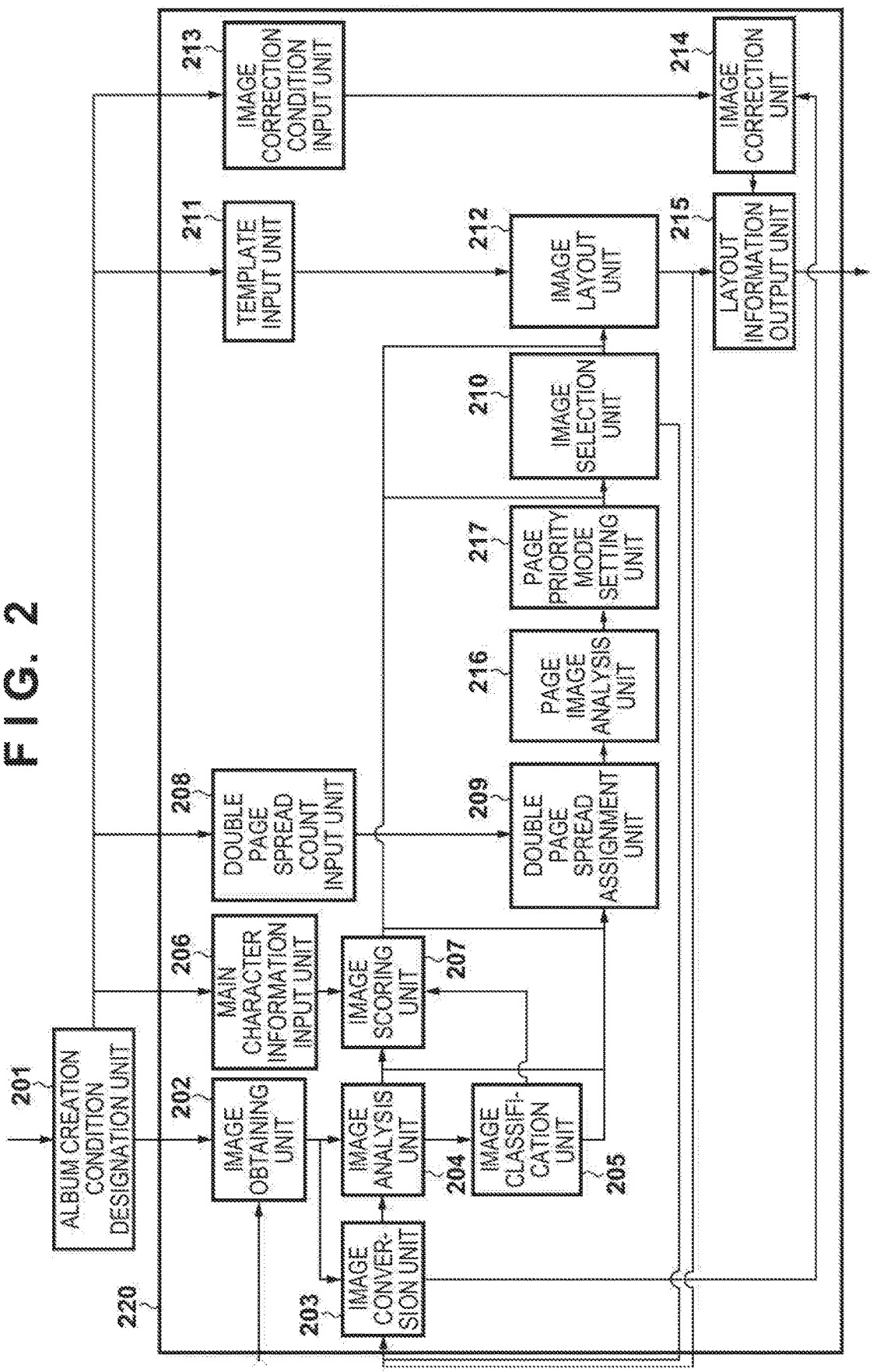
FIG. 2 is a block diagram showing an example of the software arrangement of an application according to the first embodiment.

FIG. 2 is a block diagram showing an example of the software arrangement of an automatic layout processing unit 220 of the album creation application according to the present invention. Referring to FIG. 2, an album creation condition designation unit 201 designates, in the automatic layout processing unit 220, album creation conditions corresponding to a UI operation by the mouse 107. The album creation condition designation unit 201 also designates whether to set a person priority mode or pet priority mode with respect to a subject in each image to be adopted for an album. Note that priority setting for a subject is not limited to the person and pet, and another subject (predetermined object) may be selectable as a target. The selected priority mode is not limited to the two modes. More options may be presented and a priority mode may be selectable from the presented options. In addition, the album creation condition designation unit 201 executes other processes such as designation of a main character and designation of a double page spread count (both will be described later).

An image obtaining unit 202 obtains, from the HDD 104, an image group designated by the album creation condition designation unit 201. An image conversion unit 203 converts, into image data of a desired pixel count and color information, image data to be used for subsequent processing. In this embodiment, the image conversion unit 203 converts image data into analysis images of a pixel count of 420 pixels on a short side and sRGB color information. An image analysis unit 204 executes, for each analysis image, feature amount obtaining processing, face detection processing, expression recognition processing, and personal recognition processing, and processing of recognizing an object (for example, a pet) other than a person. The image analysis unit 204 also performs processing of, for example, obtaining a shooting date/time from data (for example, Exif information) added to the image obtained from the HDD 104. An image classification unit 205 executes scene division and scene classification (both will be described later) for the image group using shooting date/time information, the number of images, and detected face information. A scene indicates a shooting scene such as a trip, daily life, or a wedding ceremony scene. The type of scene is not specifically limited. The type of scene may be arbitrarily set by the user, or a plurality of scenes may be defined in advance.

An image scoring unit 207 scores each image. For example, the image scoring unit 207 performs scoring so that an image appropriate for the layout has a high score. In this embodiment, by providing the album creation condition designation unit 201 and the image classification unit 205, a setting can be made to prioritize a person as a subject in a wedding ceremony scene or prioritize a pet as a subject in a trip scene. Although described in detail later, the image scoring unit 207 performs scoring using the information from the image analysis unit 204 and the information from the image classification unit 205.

A main character information input unit 206 inputs, to the image scoring unit 207, the ID (identification information) of a main character instructed by the album creation condition designation unit 201. Note that the main character is not limited to a person, and an arbitrary object is applied. The image scoring unit 207 sets a higher score for an image including the main character ID input from the main character information input unit 206. Furthermore, if an object other than a person is recognized based on the priority mode designated by the album creation condition designation unit 201, the image scoring unit 207 sets a higher score for the object.

A double page spread assignment unit 209 divides an image group and assigns images to each double page spread. In this example, assume that each double page spread is formed from two pages. However, for example, a portion (the first page of an album when the cover is opened) to which only images for one page are assigned in terms of the arrangement of a book may be included as a target. A double page spread count input unit 208 inputs, to the double page spread assignment unit 209, the double page spread count of the album designated from the album creation condition designation unit 201. The double page spread assignment unit 209 divides the image group in accordance with the input double page spread count, and assigns some images of the image group to each double page spread.

A page image analysis unit 216 analyzes the image group divided for each double page spread by the double page spread assignment unit 209. The page image analysis unit 216 determines which of a person and a pet is included as a subject in a larger number of images of the image group divided for each double page spread. The page image analysis unit 216 may determine, using a scene set by the image classification unit 205, which of the scores of a person image and a pet image is higher. A page priority mode setting unit 217 determines a subject for each double page spread analyzed by the page image analysis unit 216, and sets a priority mode for each double page spread in accordance with a determination result. Information of the set priority mode for each double page spread is sent to an image selection unit 210.

Based on the information of the priority mode set by the page priority mode setting unit 217, the image selection unit 210 selects images from the image group assigned to each double page spread by the double page spread assignment unit 209. At this time, the image selection unit 210 selects images based on the scores set by the image scoring unit 207.

A template input unit 211 inputs, to an image layout unit 212, a plurality of templates corresponding to the template information designated from the album creation condition designation unit 201. The template information can be designated by the user via a UI screen. The image layout unit 212 decides a layout by selecting, from the plurality of templates input from the template input unit 211, a template suitable for the images selected by the image selection unit 210, and assigning the selected images to the selected template. A layout information output unit 215 outputs layout information for display on the display 105 in accordance with the image layout decided by the image layout unit 212. The layout information is, for example, bitmap data in which the selected images are laid out on the selected template.

An image correction condition input unit 213 inputs, to an image correction unit 214, an ON/OFF condition of image correction designated from the album creation condition designation unit 201. The image correction unit 214 performs correction processing such as dodging correction, red-eye correction, and contrast correction for each image. Note that these correction processes are merely examples, and other processes may be included. If the image correction condition is ON, the image correction unit 214 performs correction for each image. If the image correction condition is OFF, the image correction unit 214 performs no correction. Note that the image correction unit 214 turns ON/OFF correction for each image input from the image conversion unit 203. Note also that ON/OFF of correction may be settable for each kind of correction processing. The pixel count of the image input from the image conversion unit 203 to the image correction unit 214 can be changed in accordance with the size of the layout decided by the image layout unit 212.

When the album creation application according to the present invention is installed in, for example, the PC, an activation icon is displayed on the top screen (desktop) of an OS (Operating System) operating on the PC. When the user double-clicks, by the mouse 107, the activation icon on the desktop displayed on the display 105, the program of the album creation application saved in the HDD 104 is loaded into the RAM 103. When the CPU 101 executes the program loaded into the RAM 103, the album creation application is activated. Note that the present invention is not limited to this arrangement, and the album creation application may operate as a Web application via a Web browser (not shown).

[Display Screen]

FIG. 3 is a view showing an example of the arrangement of a display screen 301 provided by the album creation application according to the present invention, which is displayed on the display 105. The user can set album creation conditions via the display screen 301.

A path box 302 indicates the save location (path), in the HDD 104, of an image group as an album creation target. When a folder selection button 303 is clicked, a tree structure formed from folders each including an image group as an album creation target is displayed. The user can select an image group from the displayed tree structure. A folder path including the image group selected by the user is displayed in the path box 302. A main character designation icon 304 is an icon (button) for designating a main character, in which face images of persons are displayed as icons. In the main character designation icon 304, icons of a plurality of different face images are arranged. When one of the icons is clicked, a corresponding image is selected. More specifically, person images assigned with IDs are arranged in the main character designation icon 304 at the end of processing in step S405 (to be described later).

A double page spread count box 305 is used to designate a double page spread count. The user directly inputs a number to the double page spread count box 305 using the keyboard 106, or inputs a number to the double page spread count box 305 from a list using the mouse 107. A template designation icon 306 includes illustration images based on which the styles (pop art style, chic style, and the like) of templates are identified. The above-described template information corresponds to the illustration image. However, the present invention is not limited to this, and a specific template may be designable. In this example, a plurality of template icons are arranged, and can be selected by clicking. A checkbox 307 is a setting item for designating ON/OFF of image correction. If the checkbox 307 is checked, image correction ON is set. If the checkbox 307 is not checked, image correction OFF is set. As described above, ON/OFF may be settable for each correction process to be executed.

An OK button 308 is a button used to confirm the state (setting) designated on the display screen 301 and to notify the album creation condition designation unit 201 of it. When the user clicks the OK button 308, album creation conditions are designated in the automatic layout processing unit 220 via the album creation condition designation unit 201. The image obtaining unit 202 is notified of the path input to the path box 302. The main character information input unit 206 is notified of the personal ID of the main character selected in the main character designation icon 304. The double page spread count input unit 208 is notified of the double page spread count input to the double page spread count box 305. The template input unit 211 is notified of the template information selected in the template designation icon 306. The image correction condition input unit 213 is notified of ON/OFF of image correction indicated by the image correction checkbox. A reset button 309 is a button used to reset the respective pieces of setting information on the display screen 301.

[Processing Procedure]

Figure 4A:
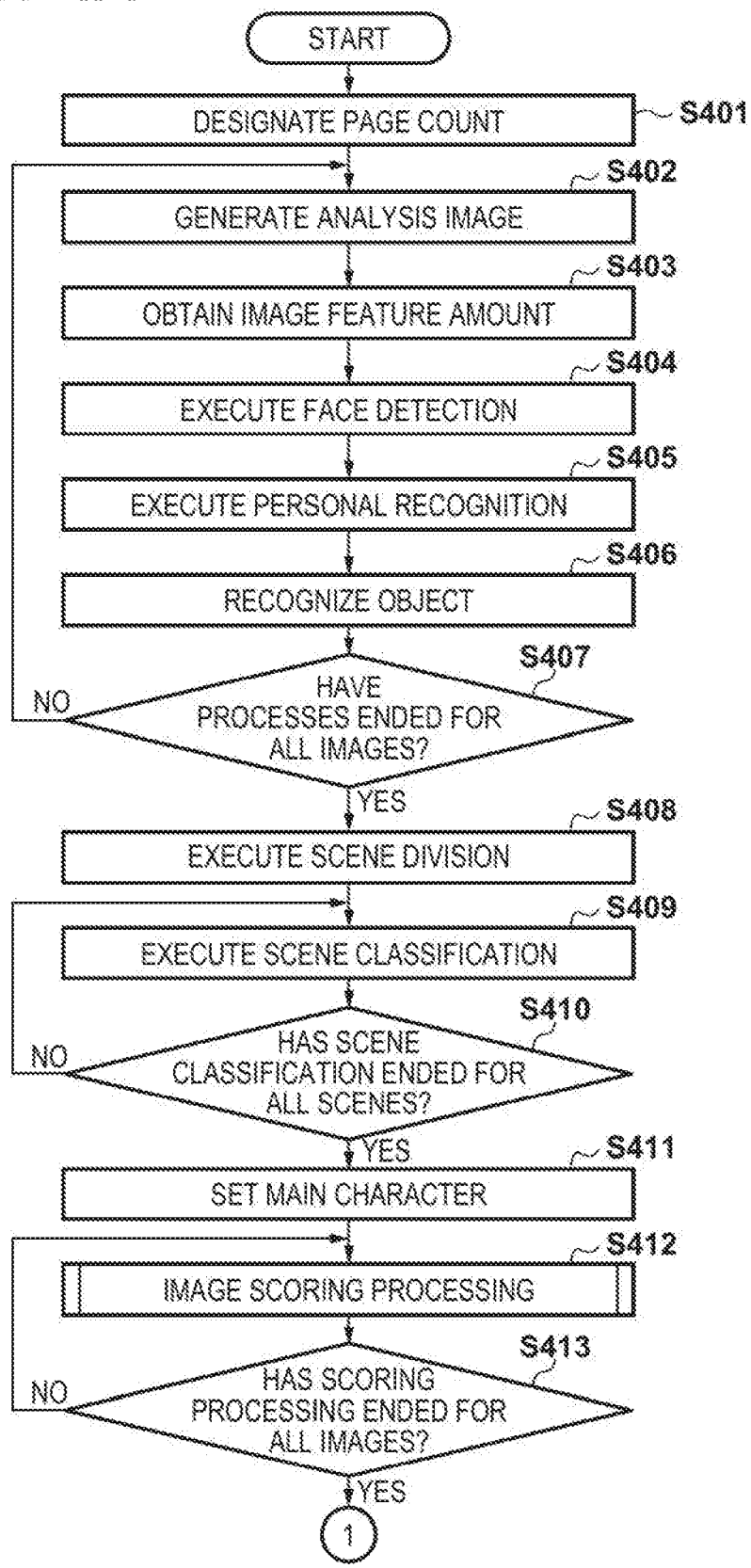
FIGS. 4A and 4B are flowcharts illustrating the procedure of automatic layout processing according to the first embodiment.
Figure 4B:
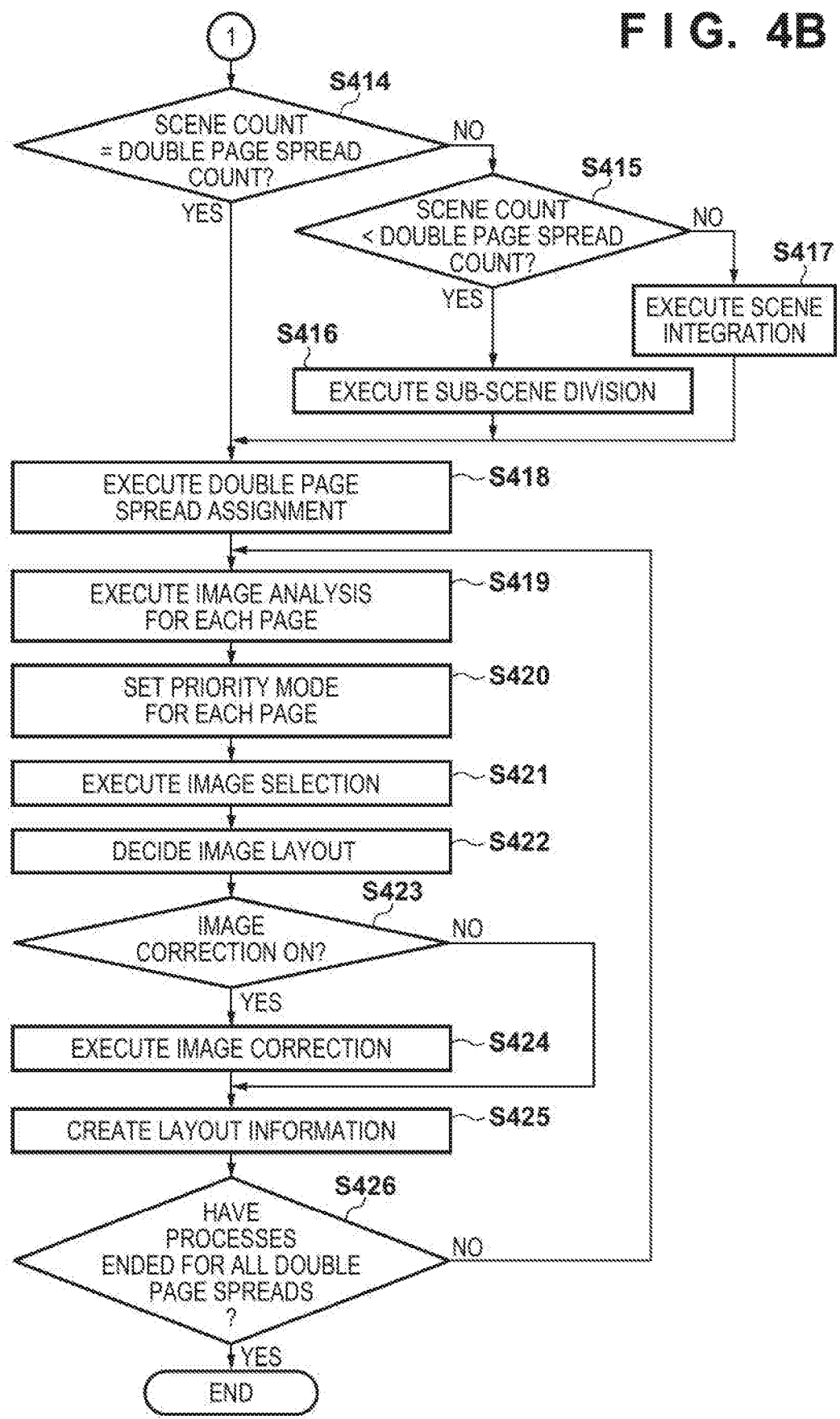

FIGS. 4A and 4B are flowcharts illustrating the processing of the automatic layout processing unit 220 of the album creation application according to the present invention. The flowcharts shown in FIGS. 4A and 4B are implemented when, for example, the CPU 101 loads the program stored in the HDD 104 into the RAM 103 and executes it.

In step S401, the album creation condition designation unit 201 accepts designation of an album page count. The user designates the page count of an album to be created via the display screen 301.

In step S402, the image conversion unit 203 generates an analysis image. The image conversion unit 203 converts each image designated by the album creation condition designation unit 201 into an image of a desired pixel count and color information. In this embodiment, each image is converted into an analysis image of a pixel count of 420 pixels on a short side and sRGB color information.

In step S403, the image analysis unit 204 obtains an image feature amount. The image analysis unit 204 obtains a shooting date/time from information (for example, Exif information) added to each image data obtained from the HDD 104. The image analysis unit 204 obtains a feature amount from the analysis image generated in step S402. An example of the feature amount is focus. A Sobel filter is generally known as an edge detection method.

The gradient of an edge can be calculated by performing edge detection using the Sobel filter, and dividing the luminance difference between the start and end points of the edge by the distance between the start and end points. The average gradient of the edges in the image is calculated. An image having a large average gradient can be considered to be in better focus than an image having a small average gradient. It is possible to output a focus amount by setting a plurality of different thresholds for the gradient and performing determination based on comparison with each threshold. In this embodiment, two different thresholds are set, and a focus amount is determined in three levels of ○, Δ, and x. The gradient of the focus to be adopted for the album is determined as ○, the allowable gradient of the focus is determined as Δ, and the unallowable gradient of the focus is determined as x, thereby setting each threshold through an experiment. The number of thresholds to be set is not limited to two and may be arbitrarily changeable by the user. That is, the focus amount may be determined in more levels.

In step S404, the image analysis unit 204 executes face detection for the processing target image. The image analysis unit 204 detects a face from the analysis image generated in step S402. A well-known method can be used for the face detection processing. For example, Adaboost for creating a strong discriminator from a plurality of prepared weak discriminators is used. In this embodiment, the strong discriminator created by Adaboost is used to detect the face of a person (object). The image analysis unit 204 extracts a face image, and also obtains the upper left coordinate value and lower right coordinate value of the position of the detected face. By having these two kinds of coordinates, the position and size of the face can be specified. Note that a strong discriminator may be created by Adaboost by setting, as a detection target, an object such as an animal like a dog or cat, a flower, a food, a building, or a decorative object instead of the face. This allows the image analysis unit 204 to detect an object other than the face.

In step S405, the image analysis unit 204 executes personal recognition for the detected face image. The image analysis unit 204 compares the similarities between the face image extracted in step S404 and representative face images saved for respective personal IDs in a face dictionary database. The image analysis unit 204 sets, as the ID of the extracted face image, a personal ID corresponding to a face image having the highest similarity that is equal to or greater than a threshold. Note that if the similarities for all the images registered in the face dictionary database are less than the threshold, the image analysis unit 204 determines the extracted face as a new face, assigns a new personal ID to it, and then registers the extracted face image in the face dictionary database. Note that the threshold for the similarities is predefined. In response to a user request, the threshold for the similarities may be changed, thereby making it possible to control the recognition accuracy.

The image analysis information obtained in steps S403 to S405 are discriminated and stored for each ID (image ID) for uniquely identifying each image, as shown in FIG. 5. The image analysis information is held in, for example, the HDD 104 of the image processing apparatus. The shooting date/time information and focus determination result obtained in step S403 and the number of faces and position information detected in step S404 are saved. Note that the position information of the face is discriminated and stored for each personal ID obtained in step S405.

In step S406, the image analysis unit 204 recognizes an object other than a person. For each image, a subject other than a person, such as a pet like a dog or cat, a ball or stuffed toy as a plaything for the pet, the grass or sea indicating the outdoors, or a window or cushion indicating the indoors, is recognized. As a recognition method, there are widely known various techniques such as a pattern matching method, a machine learning method, and recent CNN (Convolutional Neural Network). The present invention is not specifically limited. When exemplifying CNN, a neural network that can recognize about 1,000 objects is used to calculate the reaction value (score) of each object existing in the image. Based on the result of CNN, the score of each object recognized as a subject in the present invention is obtained. These scores are used in image scoring processing in step S412 (to be described later).

In step S407, the image analysis unit 204 determines whether steps S402 to S406 have ended for all of the images designated by the album creation condition designation unit 201. If steps S402 to S406 have not ended (NO in step S407), the process returns to step S402. Otherwise (YES in step S402), the process advances to step S408.

Figure 6A:
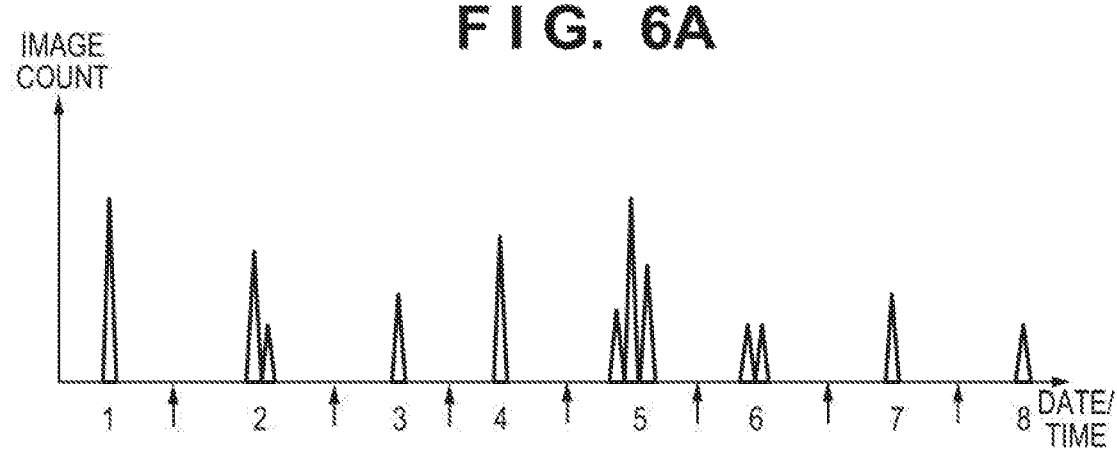
FIGS. 6A, 6B, and 6C are graphs for explaining image group division according to the present invention.

In step S408, the image classification unit 205 executes scene division. The image classification unit 205 divides the image group into a plurality of scenes based on the time difference between the images, which has been calculated from the shooting date/time information obtained in step S403. If a date when no shooting is performed exists between the shooting dates/times of the images, these images are divided into different scenes. A case in which shooting dates are consecutive will be described next. Assume, for example, that a threshold for the time difference between the images is set to sixteen hours. If the time difference is sixteen hours or longer, the corresponding images are divided into different scenes. When the time difference is shorter than sixteen hours, if the time difference between the first shooting operation and the last shooting operation on each of the consecutive dates is shorter than four hours, the images within the time are divided into the same scene. When the time difference is equal to or longer than four hours, if the number of shot images on each of the consecutive dates is less than fifty, these images are divided into the same scene. If the number of shot images is equal to or greater than fifty, the image group is divided into different scenes. FIG. 6A is a graph showing the result of performing division by the above-described scene division method. In FIG. 6A, the ordinate represents the image count, and the abscissa represents the date/time. Furthermore, each number for the date/time indicates the number of divided groups (scenes), and each solid arrow indicates a division position.

In step S409, the image classification unit 205 executes scene classification. This embodiment will describe an example of using three kinds of scenes, that is, trip, daily life, and ceremony scenes. This embodiment will explain an example of assuming that there are "trip", "daily life", and "ceremony" scenes as kinds of scenes, and classifying each sub image group into one of these scenes. Note that a scene classification table storing information of a feature amount corresponding to each kind of a scene is used for scene classification scoring processing.

A scene classification table creation method stored in advance in the program will be described. First, a plurality of image data groups determined in advance to be classified into the "trip", "daily life", and "ceremony" scenes are collected by the designer of the program, and feature amounts are obtained for each of the collected image data groups. Examples of the obtained feature amounts are a shooting period, the number of shot images, and the number of shot people. The shooting period is the shooting time difference between the first generated image data and last generated image data of each image data group. The number of shot images is the number of images of each image data group. The number of shot people is the average number of faces included in each of the images represented by each image data group. As a result, for one image data group of the plurality of image data determined in advance as a trip scene, the feature amounts of the shooting period, the number of shot images, and the number of shot people are obtained. Note that the feature amounts are not limited to the shooting period, the number of shot images, and the number of shot people, and other feature amounts may be used or only some of the feature amounts may be used.

Feature amounts of a shooting period, the number of shot images, and the number of shot people are obtained for each of the remaining image data groups collected in advance. Then, based on the feature amounts obtained from the plurality of image data groups collected for each scene, the average value and standard deviation of the shooting periods, those of the numbers of shot images, and those of the numbers of shot people per image are obtained. The thus obtained values and each scene are associated, thereby creating a scene classification table indicating the respective average values and standard deviations for each scene.

The image classification unit 205 obtains feature amounts for each image group divided for each scene in step S408. Examples of the obtained feature amounts are a shooting period, the number of shot images, and the number of shot people. The shooting period is the time difference between the first shooting operation and last shooting operation of the image group. The number of shot images is the number of images of the image group. The number of shot people is the number of faces in an image including faces. For example, if three faces are detected from one image, the number of shot people of the image is "3".

The image classification unit 205 obtains the average value and standard deviation of the shooting periods, those of the numbers of shot images, and those of the numbers of shot people per image for the plurality of image groups collected (divided) for each scene. FIG. 7 shows the above-described scene classification table including the average values and standard deviations obtained in this embodiment. This table is embedded in advance in the program of the album creation application. After the album creation application is activated, the image classification unit 205 obtains image groups obtained by executing scene division in step S408 for the image group designated by the user in the path box 302. The image classification unit 205 calculates, for each image group, the shooting period, the number of shot images, and the average number of shot people. For the feature amounts of the shooting period, the number of shot images, and the number of shot people of each image group, using the average values and standard deviations for each scene in FIG. 7, a score is calculated by:

$$\text{score}=50-|10\times(\text{average value}-\text{feature amount})/\text{standard deviation}|$$

$$\text{average score}=(\text{score of shooting period}+\text{score of number of shot images}+\text{score of number of shot people})/\text{feature amount item count}$$

where $|X|$ represents the absolute value of X.

The above processing calculates the average score for each of the trip, daily life, and ceremony scenes for each image group. A scene for which each image group has the highest score is determined as the scene of the image group. If there are scenes for which the image group has equal scores, the image group is classified into a priority scene. For example, in this embodiment, the priority levels of the respective scenes are set in order of daily life>ceremony>trip. That is, the highest priority level is set for the daily life scene. In other words, if among the scores calculated for a given image group, the score for the daily life scene is equal to that for the ceremony scene, the image group is classified into the daily life scene. Note that the priority levels are not limited to the above ones, and may be settable by the user.

For example, for image group five after scene division shown in FIG. 6A, a shooting period is 36 hours, the number of shot images is 300, and the number of shot people is 1.7. The average score for the trip scene is 45.32, the average score for the daily life scene is 18.38, and the average score for the ceremony scene is −29.92. Thus, image group five is classified into the "trip" scene. The scene into which the image data group is classified is managed by a scene ID so as to be identified. Note that values calculated for each image group and the equations for calculating the score using the values are not limited to the above ones, and a score may be decided using more factors.

In step S410, the image classification unit 205 determines whether the scene classification processing in step S409 has ended for all of the scenes (all the image groups) divided in step S408. If the scene classification processing has not ended (NO in step S410), the process returns to step S409; otherwise (YES in step S410), the process advances to step S411.

In step S411, the image scoring unit 207 sets a main character. A main character is set for the image group designated by the user, and can be set automatically or manually. Based on the result of the personal recognition processing performed in step S405 and the result of the scene division processing performed in step S408, the number of times each personal ID appears in the image group, the number of times each personal ID appears in each scene, and the number of scenes in which each personal ID appears can be identified. If a main character is automatically set, the image scoring unit 207 automatically sets a main character based on these pieces of information. In this embodiment, if there are a plurality of scenes in one album, a personal ID appearing in a plurality of scenes is set as a main character ID.

If the image group is classified into a single scene, a personal ID that often appears in the single scene is set as a main character ID. If the user designates the main character designation icon 304 of the display screen 301 shown in FIG. 3 (that is, if a main character is manually set), the image scoring unit 207 is notified of a personal ID via the main character information input unit 206. If there is the personal ID designated by the user, the image scoring unit 207 sets, as a main character ID, the personal ID designated by the user, instead of the automatically set main character ID. This setting processing will be referred to as "manual setting processing" hereafter.

In step S412, the image scoring unit 207 performs scoring processing. The scoring processing assigns a score that is a value to be referred to at the time of image selection (to be described later) and is obtained by performing evaluation for each image in terms of a point (to be described later).

FIG. 10A shows a template group to be used to lay out images. A template 1001 includes three slots (frames in which images are laid out) that are formed from a main slot 1002 and sub-slots 1003 and 1004. The main slot 1002 is a main slot in the template 1001, and is larger in size than the sub-slots 1003 and 1004. In the scoring processing, a score for a main slot and that for a sub-slot are assigned to each image.

FIG. 8A shows the concept of a scoring axis. According to this embodiment, with respect to the three scenes, that is, the trip, daily life, and ceremony scenes into which the images can be classified by the scene classification processing in step S409, preferred image features are summarized in a table. That is, the viewpoints of a photo considered to be preferable for each of the trip, daily life, and ceremony scenes are different. A composition that is most preferable in a trip scene is, for example, a photo including both symbolic scenery at a destination and a person as a main character in the trip. On the other hand, in the ceremony scene, a photo (a photo including two people close to each other) of a composition in which the bride and bridegroom are close together is preferable. The number of kinds of photos considered to be preferable in each scene is not always limited to one. In the trip scene, in addition to the above-described photo including a person and scenery, a close-up photo of a face, a photo of a face in profile, photos taken with a person who joined the trip and a person who met at the destination, photos of a food, building, and scenery at the destination, and the like, are considered to be preferable.

As described above, a condition of a preferable photo is different for each scene, and one or more conditions of preferable photos exist in each scene. In this embodiment, to calculate two scores for a main slot and a sub-slot, two conditions of preferable photos are set in each scene.

A plurality of images determined in advance as images complying with the features for the main slot and sub-slot of each scene shown in FIG. 8A are collected. Then, features of the face count, face position, and face size of each of the collected images are collected to calculate the average values and standard deviations for each slot type (each of the main slot and sub-slot) of each scene. The calculated average values and standard deviations are held to be usable by the album creation application. A scene to which each image of the image group designated by the user belongs can be specified based on the result of the scene classification processing in step S409. The image scoring unit 207 calculates scores and an average score for the above average values and standard deviations calculated in advance and corresponding to the scene of the image of interest and the respective feature amounts of the face count, face position, and face size of the main character ID of the image of interest by:

score=50−|10×(average value−feature amount)/standard deviation| average score=(score of face count+score of face position+score of face size)/feature amount item count where |X| represents the absolute value of X. Note that the above equations are merely examples, and the present invention is not limited to them.

The image scoring unit 207 executes scoring for both the main slot and the sub-slot. Note that since an image to be used for the album is more preferably in focus, a score may be added for an image of an image ID having ◯ as the feature amount of the focus shown in FIG. 5. FIG. 8B shows an example of the score result of the above scoring processing for a given scene, in which for each image ID (each image), the scores for the main slot and sub-slot are calculated and assigned.

The image scoring unit 207 also obtains the result of the object recognition processing performed in step S406. If the score of a dog for an object included in an image is equal to or greater than a preset threshold, the image scoring unit 207 determines the image to be a dog image. Furthermore, the score of an object (ball, grass, dogsled, or the like) associated with a dog is determined based on a threshold in the same manner. If the score is equal to or greater than the threshold, the score may be combined with the score of the dog. As the simplest method of combining the scores, the score of the dog is weighted by a coefficient larger than 1, and the score of the other object is added to the obtained score. With this processing, an image including the dog and ball has a score higher than that of an image including only the dog. If the image includes the dog and ball, a state in which the dog is chasing the ball can be estimated. By increasing the score of the image, it is possible to readily select images of a wider range of variations for the album. The obtained score may be an absolute value output from CNN or an output value of a normalization function such as a Softmax function.

Figure 11:
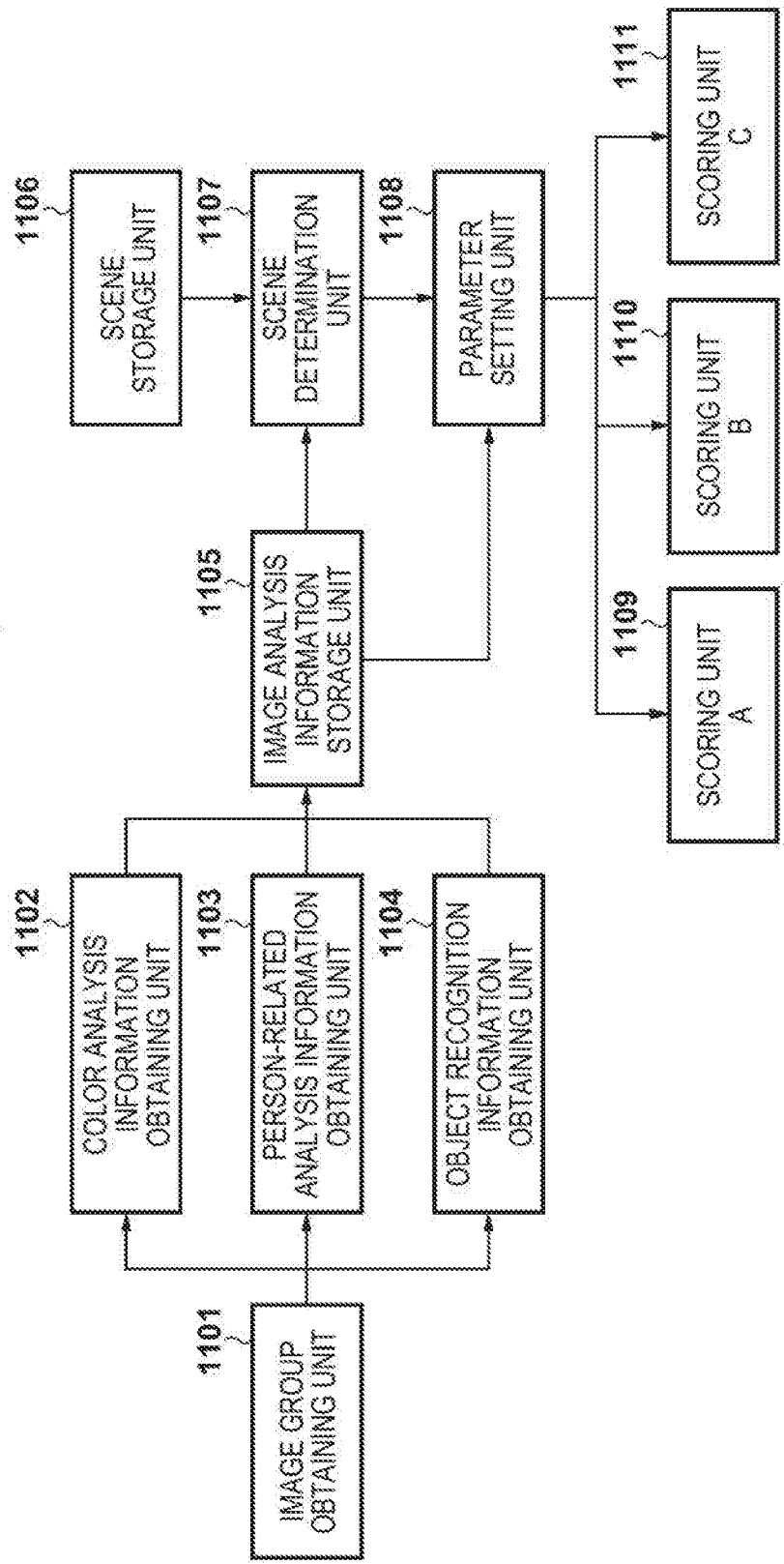
FIG. 11 is a block diagram for explaining a detailed arrangement associated with scoring according to the present invention.

FIG. 11 is a block diagram showing, in more detail, an example of the arrangement of the image scoring unit 207 according to this embodiment.

An image group obtaining unit 1101 obtains an image group input from the user. At the time of obtaining the image group, the image group obtaining unit 1101 obtains scene division information obtained in the scene division processing by the image classification unit 205 in step S408.

A color analysis information obtaining unit 1102 obtains a processing result corresponding to the image feature amount obtaining processing in step S403. The color analysis information obtaining unit 1102 also obtains the shooting date/time information of the image. Furthermore, the color analysis information obtaining unit 1102 obtains analysis information such as the tint and edge of the image, and the focus amount.

A person-related analysis information obtaining unit 1103 obtains processing results corresponding to the face detection processing in step S404 and the personal recognition processing in step S405. Furthermore, the person-related analysis information obtaining unit 1103 obtains information in the main character setting processing in step S411.

An object recognition information obtaining unit 1104 obtains a processing result corresponding to the object recognition processing in step S406.

An image analysis information storage unit 1105 comprehensively manages various kinds of analysis information obtained by the color analysis information obtaining unit 1102, person-related analysis information obtaining unit 1103, and object recognition information obtaining unit 1104. At this time, the image analysis information storage unit 1105 obtains all of the pieces of information including the feature amounts in the image. A secondary feature that can be calculated/estimated from the color analysis information obtaining unit 1102 and person-related analysis information obtaining unit 1103 is also included in the information obtained by the image analysis information storage unit 1105. For example, not only the positions of the respective faces obtained in step S404, but also the distance between the faces that can be estimated based on the positions is included in the obtained information. The image analysis information stored in the image analysis information storage unit 1105 is not limited to this. Not only the pieces of information obtained by the color analysis information obtaining unit 1102, person-related analysis information obtaining unit 1103, and the object recognition information obtaining unit 1104, but also secondary information may be managed. Furthermore, only one of the pieces of information obtained by the color analysis information obtaining unit 1102, person-related analysis information obtaining unit 1103, and the object recognition information obtaining unit 1104 may be used.

A scene storage unit 1106 stores the respective kinds of shooting scenes, and information about a scene classification method for determining each shooting scene. In this embodiment, the scene storage unit 1106 stores three kinds of scenes, that is, the trip, daily life, and ceremony scenes, and a program associated with a scene classification method for determining each scene.

A scene determination unit 1107 determines the shooting scene of each image based on the image analysis information stored in the image analysis information storage unit 1105. The scene determination unit 1107 obtains a processing result corresponding to the scene classification processing in step S409. In this embodiment, each image is classified into the trip, daily life, or ceremony scene based on the image analysis information.

A parameter setting unit 1108 decides the shooting scene of each image by the scene classification processing executed by the scene determination unit 1107. The parameter setting unit 1108 sets, based on the decided shooting scene, parameters to be used for scoring. Parameters decided in advance by machine learning may be used, or the parameters may be manually set by the user based on the empirical rule of an engineer or at the time of execution of the system.

A scoring unit A 1109, a scoring unit B 1110, and a scoring unit C 1111 are provided with different parameters from the parameter setting unit 1108. Each scoring unit scores the image based on the parameters set by the parameter setting unit 1108 and the image analysis information obtained by the image analysis information storage unit 1105. In this embodiment, one of the scores obtained by the scoring unit A 1109, the scoring unit B 1110, and the scoring unit C 1111 corresponds to one of the scores for the main slot 1002 and sub-slots 1003 and 1004 of the template 1001. The number of scoring units is not particularly limited. For example, if there are three or more scoring axes required for album creation, three or more scoring units can be set in accordance with the number of scoring axes. If fewer than three scoring axes are enough, fewer than three scoring units are set.

The image scoring unit 207 has been explained in detail above. With this processing arrangement, it is possible to execute scoring in accordance with the shooting scene of each image by calculating the score of the image. Since a scoring axis and a parameter decision method are not the same between the shooting scenes, it is possible to obtain an image of a composition or person count optimum for each shooting scene.

(Scoring Processing)

Figure 12:
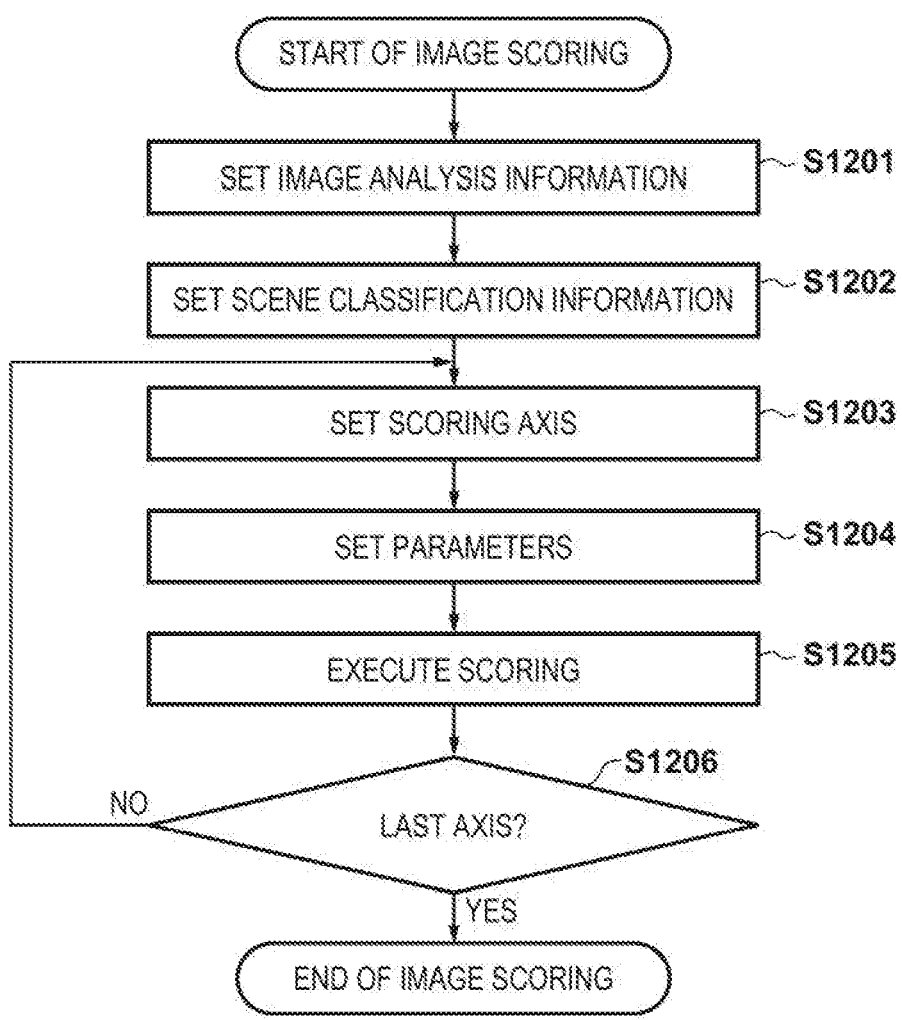
FIG. 12 is a flowchart illustrating the detailed processing procedure of scoring processing according to the present invention.

FIG. 12 is a flowchart illustrating details of step S412 of FIG. 4A, and executed by the respective components of the image scoring unit 207 shown in FIG. 11. FIG. 12 is especially a flowchart for explaining the processing after the scene classification processing in detail. As an example, a detailed procedure associated with scoring of an image classified into a given shooting scene will be described.

In step S1201, the image scoring unit 207 obtains the pieces of image analysis information from the image analysis information storage unit 1105 that manages the pieces of image analysis information of the color analysis information obtaining unit 1102, person-related analysis information obtaining unit 1103, and object recognition information obtaining unit 1104, and sets them.

In step S1202, the image scoring unit 207 sets, for each image group, the shooting scene of the image classified by the scene determination unit 1107 based on the scene classification method prepared in the scene storage unit 1106. In this embodiment, one of the trip, daily life, and ceremony scenes is set.

In step S1203, the image scoring unit 207 sets a scoring axis. That is, in the example shown in FIG. 11, the image scoring unit 207 sets one of the scoring unit A 1109 to the scoring unit C 1111 to execute scoring processing. In step S1206 (to be described later), a loop is performed the number of times that is equal to the number of axes. However, the scoring unit A 1109 is set as a scoring axis in the first loop, the scoring unit B 1110 is set as a scoring axis in the next loop, and the scoring unit C 1111 is set as a scoring axis in the last loop. In this embodiment, when i (i>0) represents the shooting scene ID of the image set in step S1202 and j (j>0) represents the number of the scoring axis, the scoring axis can be indicated by $e_{i,j}$.

In step S1204, the image scoring unit 207 sets parameters requested at each scoring axis in the set shooting scene of the image. As described above, since the parameter setting unit 1108 decides the parameters corresponding to the shooting scene, the parameters are set in this step. If, for example, a wedding ceremony scene is obtained in the scene classification processing and the scoring axis is the scoring unit A 1109, parameters obtained by machine learning are set to calculate the score for the main slot 1002 with respect to a wedding image. Every time the scene or scoring axis changes, parameters are set accordingly.

In step S1205, the image scoring unit 207 performs scoring in accordance with the set parameters. In scoring, the set n (n>0) parameters and information of a threshold Th and weight W associated with each parameter are used. The image analysis information obtained in step S1201 is compared with a determination threshold $Th_{n,ei,j}$. If the parameter value exceeds the determination threshold $Th_{n,ei,j}$, a determination weight $W_{n,ei,j}$ is added to a score at each scoring axis of the image. When $S_{i,j}$ represents the added accumulated value, $S_{i,j}$ indicates the final score. The final score at each scoring axis is added with the accumulating addition-subtraction value of the determination weight W of each parameter.

Note that there may be a parameter (parameter not to be used) having a weight of zero depending on a scoring axis. On the other hand, a parameter which should be emphasized in any shooting scene or at any scoring axis may be commonly used.

Finally, in step S1206, the image scoring unit 207 determines whether the scoring axis is the last one. If it is determined that the scoring axis is not the last one (NO in step S1206), the process returns to step S1203; otherwise (YES in step S1206), the processing procedure ends. With the above processing, in the example of this embodiment, for the scoring target image, a score corresponding to the main slot 1002, that corresponding to the sub-slot 1003, and that corresponding to the sub-slot 1004 are calculated.

FIG. 8B shows examples of a score for a main slot and scores for sub-slots, which are obtained for each image in the scoring processing. By obtaining scores at each scoring axis, how much the image satisfying the desired condition is superior or inferior to the remaining images can be determined. At this time, the scores may be normalized so as to evaluate superiority and inferiority between the different scoring axes.

Referring back to FIG. 4A, in step S413, the image scoring unit 207 determines whether the scoring processing in step S412 has ended for all of the images of the image data group designated by the user. If it is determined that the scoring processing has not ended for all of the images (NO in step S413), the process returns to step S412. Otherwise (YES in step S413), the process advances to step S414.

In step S414, the double page spread assignment unit 209 determines whether the division count obtained in the scene division processing (step S408) by the image classification unit 205 is equal to the double page spread count input from the double page spread count input unit 208. If it is determined that these counts are not equal to each other (NO in step S414), the process advances to step S415. Otherwise (YES in step S414), the process advances to step S418. For example, in the example shown in FIG. 6A, the scene division count is "8" (1 to 8 shown in FIG. 6A). At this time, if the count input from the double page spread count input unit 208 is "8", YES is determined in step S414, and the process advances to step S418.

In step S415, the double page spread assignment unit 209 determines whether the division count obtained in the scene division processing (step S408) by the image classification unit 205 is less than the double page spread count input from the double page spread count input unit 208. If it is determined that the division count is not less than the double page spread count (NO in step S415), the process advances to step S417. Otherwise (YES in step S415), the process advances to step S416. For example, in the example shown in FIG. 6A, the scene division count is "8". If the count input from the double page spread count input unit 208 is "10", YES is determined in step S415 and the process advances to step S416.

Figure 6B:
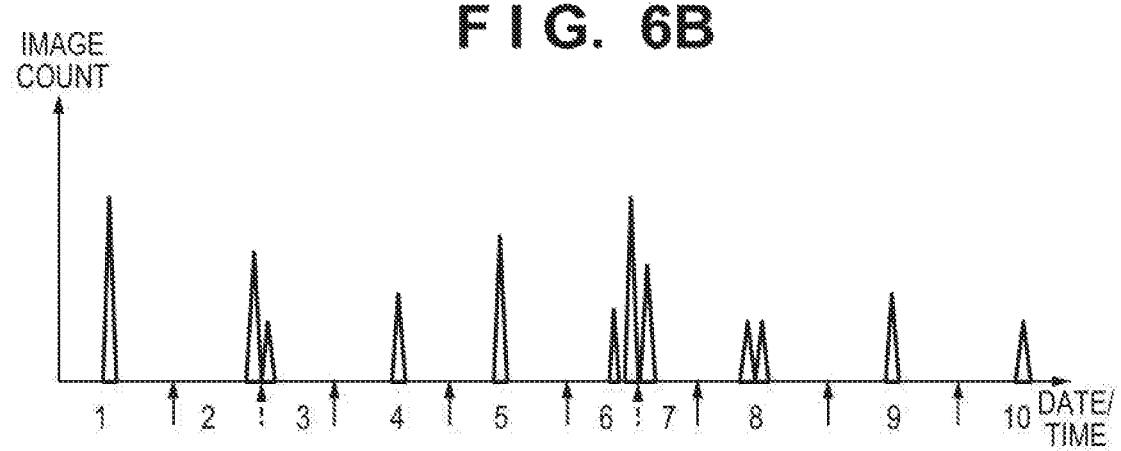

In step S416, the double page spread assignment unit 209 executes sub-scene division. Sub-scene division indicates processing of subdividing divided scenes when "scene division count<double page spread count" is satisfied. A case in which the designated double page spread count is "10" while the scene division count in FIG. 6A is "8" will be described. FIG. 6B shows a result of performing sub-scene division in the state shown in FIG. 6A. The division count is changed to "10" by dividing the scenes at positions (two positions) indicated by broken arrows. A division criterion is as follows. The divided image groups of FIG. 6A are searched for a divided image group including a large number of images. To increase the division count from "8" to "10", two scenes (image groups) are further divided and two image groups each including a large number of images are decided. Among the eight scenes (image groups) shown in FIG. 6A, image group 5 and image groups 1 and 2 are decided in descending order of the number of images. Since the numbers of images of image groups 1 and 2 are equal to each other but image group 2 has a greater time difference between the first image and the last image, image group 2 is decided as a division target. Note that the criterion to select a scene when there are a plurality of scenes including the same number of images is not limited to this, and another criterion may be used. In this example, image groups five and two are further divided respectively.

Division of image group two will be described first. As shown in FIG. 6A, image group two includes two peaks (image groups) with respect to the number of images, which have different shooting dates. Thus, image group two is divided at the position of the broken arrow shown in FIG. 6B, which corresponds to the position between the two peaks. Division of image group five will be described next. As shown in FIG. 6A, image group five includes three peaks (image groups) with respect to the number of images, which correspond to three image groups shot on three consecutive dates. Although there are two positions at which the shooting date changes, image group five is divided so that the difference in the number of images after division is small. Therefore, image group five is divided at the position indicated by the broken arrow shown in FIG. 6B. This changes the division count from "8" to "10". Note that division is performed at a position at which the shooting date changes. The present invention, however, is not limited to this. If, for example, an image group including a large number of images has one shooting date, it may be divided at a position where the time difference is largest on the shooting date. After performing sub-scene division, the process advances to step S418.

Figure 6C:
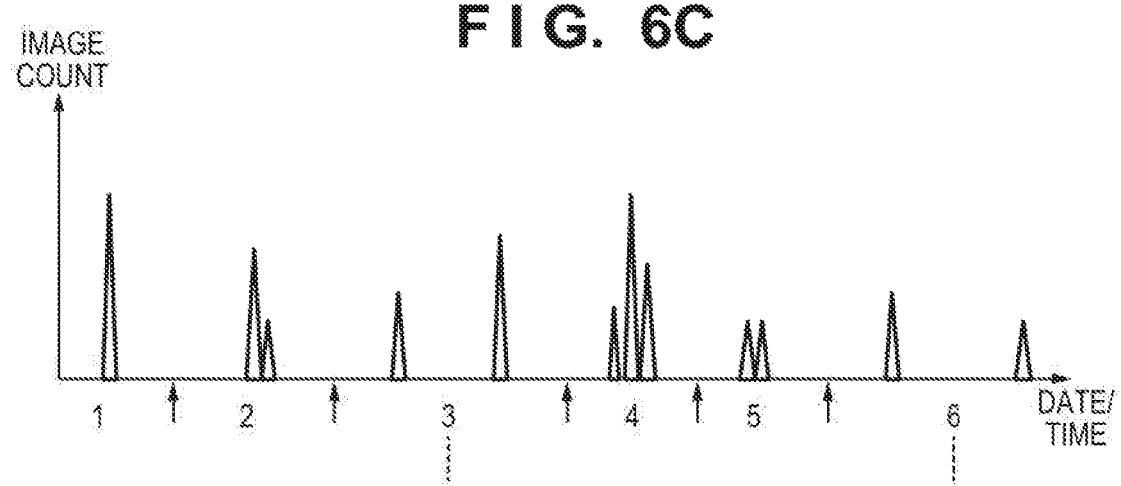

In step S417, the double page spread assignment unit 209 executes scene integration. Scene integration indicates processing of integrating the divided scenes when "scene division count>double page spread count" is satisfied. FIG. 6C shows a result of executing scene integration in the state shown in FIG. 6A. The division count is changed to "6" by integrating the scenes at positions (two positions) indicated by broken lines. An integration criterion is as follows. The divided image groups of FIG. 6A are searched for a divided image group including a small number of images. To decrease the division count from "8" to "6", two scenes are integrated into other scenes, respectively. To do this, image groups each including a small number of images are decided. Among the eight scenes (image groups) shown in FIG. 6A, image groups eight, three, and seven are decided in ascending order of the number of images. The numbers of images belonging to image groups three and seven are equal to each other. Since, however, image group eight adjacent to image group seven is already decided as an integration target, image group three is decided as an integration target. Each of image groups eight and three undergoes integration. Note that the criterion to select a scene when there are a plurality of scenes including the same number of images is not limited to this, and another criterion may be used.

Integration of image group three will be described. By comparing the time differences between image group three and its preceding and succeeding image groups two and four, it is determined that the time difference between image groups three and four is less than that between image groups two and three. Therefore, integration is performed at the position of the broken line shown in FIG. 6C. Integration of image group eight will be described next. Since image group eight has no succeeding image group (scene), it is integrated with preceding image group seven. As a result, integration is performed at the position of the broken line shown in FIG. 6C. After performing scene integration, the process advances to step S418.

In step S418, the double page spread assignment unit 209 executes double page spread assignment. As a consequence of steps S414 to S417, the scene division count is equal to the designated double page spread count. The double page spread assignment unit 209 assigns the divided image groups to the double page spreads in the shooting date/time order.

In step S419, the page image analysis unit 216 executes image analysis for each page. The page image analysis unit 216 obtains images assigned to each double page spread, and performs analysis to determine a subject included in many images and a subject image having a high score. The page image analysis unit 216 counts the number of images each including a person or pet for each page (double page spread) for the image group having undergone double page spread assignment in step S418. Alternatively, the page image analysis unit 216 analyzes the size of an included subject, the expression of a person, the estimated state of a pet, and the like. Furthermore, the page image analysis unit 216 may modify, for each page, the score of each image in accordance with the scene classified in step S409. For example, if an arbitrary double page spread is classified into a wedding ceremony scene, but an image includes a dog or cat which is difficult to appear in an image of the wedding ceremony, the score of the image is decreased. If many similar images are included, they need not be counted. A criterion for the modification processing is not limited to the above example, and another criterion may be used, or the user may be able to select a preset criterion.

In step S420, the page priority mode setting unit 217 sets a priority mode for each page using the result of performing image analysis for each page in step S419. If, for example, a person is included in many images, as compared with a pet, in the image group assigned to a processing target double page spread, the page priority mode setting unit 217 sets the person priority mode for the page. If a pet is included in many images, as compared with a person, the page priority mode setting unit 217 sets the pet priority mode for the page. Furthermore, if the scene of an arbitrary page is a wedding ceremony scene, the page priority mode setting unit 217 sets the person priority mode. In addition, if the number of pet images is low but the number of images each including a subject of a pet in a large size is large, the pet priority mode may be set. Conversely, if the number of person images is low, but there is an image having a high score of an expression as a result of expression recognition, the person priority mode may be set. For example, determination processes may be performed in order of determination of the numbers of person images and pet images, determination in consideration of a subject, and scene determination, and the result of determination performed later is prioritized, thereby setting the person priority mode or pet priority mode. Note that the page in this embodiment can be considered as a double page spread or each of pages forming a double page spread.

In step S421, the image selection unit 210 performs processing of selecting images from the image group assigned to the processing target double page spread. The image selection unit 210 obtains a result of setting the priority mode for each page in step S420, and selects images in accordance with the set priority mode. An example of selecting four images from the image group assigned to a given double page spread will be described with reference to FIGS. 9A to 9I. As a template, the template 1001 shown in FIG. 10A is used.

FIG. 9A shows a time difference (divided shooting period) between the shooting dates/times of the first and last images of the image group assigned to the double page spread. A method of selecting the first image will be described with reference to FIG. 9B. The template 1001 includes the one main slot 1002. An image for the main slot is selected as the first image. Among images corresponding to the divided shooting period shown in FIG. 9B, an image having the highest score for the main slot, which has been assigned in step S412, is selected.

Images for sub-slots are selected as the second and subsequent images. The divided shooting period is subdivided so image selection does not concentrate on part of the divided shooting period, as will be described below. As shown in FIG. 9C, the divided shooting period is divided into two parts. Next, as shown in FIG. 9D, the second image is selected from images shot during the divided shooting period indicated by a solid line during which the first image has not been selected. An image having the highest score for the sub-slot is selected from the images corresponding to the divided shooting period indicated by the solid line. As shown in FIG. 9E, each of the divided shooting periods in FIG. 9D is divided into two parts. As shown in FIG. 9F, an image having the highest score for the sub-slot is selected as the third image from images corresponding to the divided shooting periods indicated by solid lines during which neither the first image nor the second image has been selected.

A case in which no image exists in the divided shooting period during which an image is to be selected and thus no image can be selected will be described by exemplifying selection of the fourth image. In this example, as shown in FIG. 9G, the fourth image is to be selected from a hatched divided shooting period during which no image has been selected, but there is no image in the hatched divided shooting period. In this case, as shown in FIG. 9H, each of the divided shooting periods is divided into two parts. Next, as shown in FIG. 9i, an image having the highest score for the sub-slot is selected as the fourth image from images corresponding to the divided shooting periods indicated by solid lines during which none of the first to third images has been selected.

A combination of the scene classification processing in step S409 and the priority mode setting processing for each page in step S420 will be described. For example, assume that an arbitrary double page spread is classified into a "wedding ceremony" scene. If the numbers of person images and pet images in the image group assigned to the double page spread are equal to each other, the person priority mode is set in step S420 to cause the image selection unit 210 to perform processing to select many person images.

As described above, it is possible to add variations to images selected to be laid out using the scores of the images obtained at different scoring axes with respect to the main slot and sub-slot. It is possible to select images based on different determination criteria, thereby eliminating mannerism of an album.

Figure 13A:
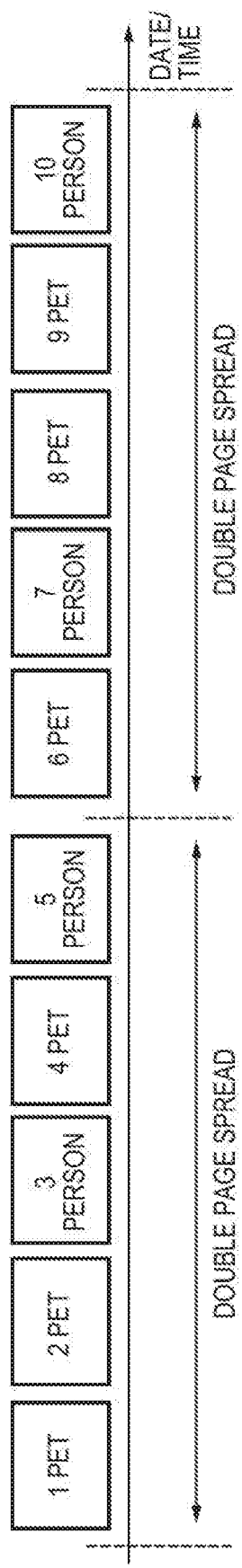
FIGS. 13A, 13B, and 13C are views for explaining double page spread assignment according to the present invention.
Figure 13B:
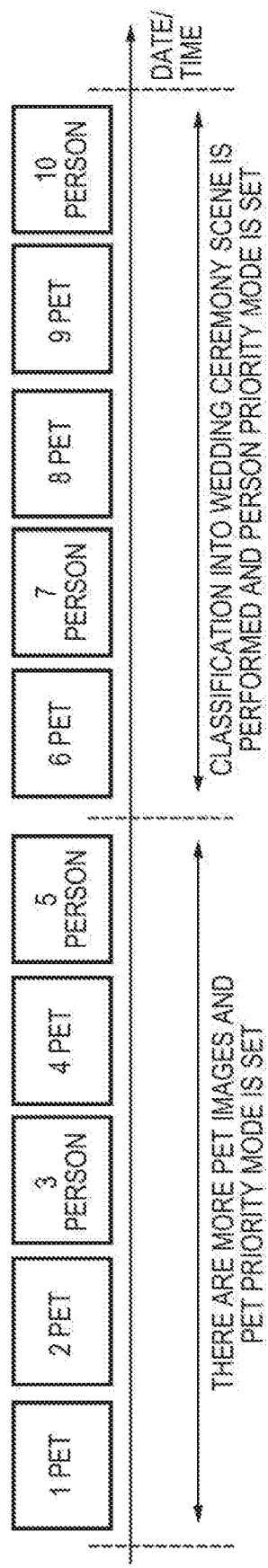
Figure 13C:
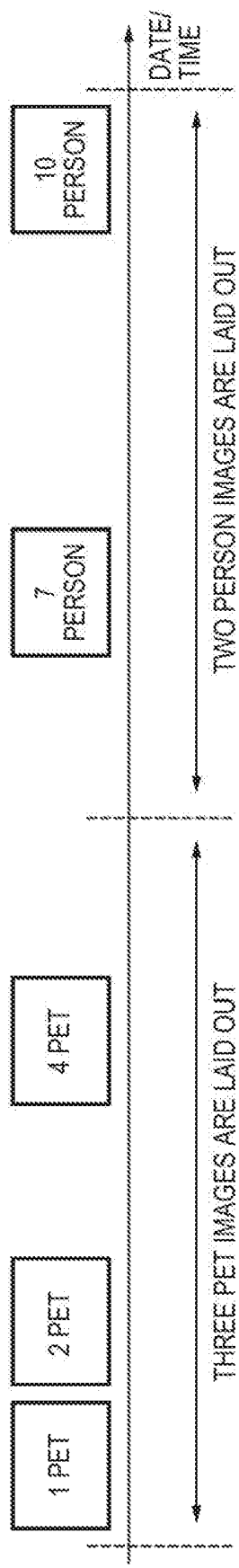

FIGS. 13A to 13C show practical examples of the processes in steps S418 to S421. FIG. 13A shows the image groups divided by the double page spread assignment unit 209. There are ten images including five person images and five pet images. In step S418, these images undergo double page spread assignment, thereby assigning the first to fifth images to the first double page spread and assigning the sixth to 10th images to the second double page spread. Subsequently, FIG. 13B shows a result of analyzing each double page spread by performing image analysis for each page in step S419. The image group of the first double page spread is analyzed to determine that the number of pet images is larger than that of person images. On the other hand, the second double page spread is classified into a wedding ceremony scene, and analyzed to determine that the score of a person image is high. As a result, in the priority mode setting processing for each page in step S420, the pet priority mode is automatically set for the first double page spread and the person priority mode is automatically set for the second double page spread. Thus, images to be laid out are selected in the image selection processing in step S421 in accordance with the priority mode automatically set for each double page spread. As shown in FIG. 13C, the three pet images are selected for the first double page spread and the two person images are selected for the second double page spread.

That is, the image selection unit 210 preferentially selects an image including an object corresponding to the priority mode set for the double page spread. If a different priority mode is set for the next double page spread, the image selection unit 210 preferentially selects an image including an object corresponding to the different priority mode. This processing makes it possible to create an album with a variety of images. Note that this embodiment has explained an example of switching the priority mode for each page unit. However, for example, a priority mode may be set for each arbitrary page unit.

In step S422, the image layout unit 212 decides an image layout. An example in which the template input unit 211 inputs templates of sixteen patterns of 1-1 to 4-4 shown in FIG. 10A for a given double page spread in accordance with the designated template information will be described. In this example, one template corresponds to one double page spread, and is formed from two pages. Note that the size of the template is not limited to this, and one template may correspond to one page (half of the double page spread).

The slot counts of the input templates are all "3". The selected three images are arranged in order of shooting date/time, as shown in FIG. 10B. An image 1005 is an image selected for the main slot and images 1006 and 1007 are images selected for the sub-slots. In a layout created in this embodiment, an image having an earlier shooting date/time is laid out in the upper left portion of the template and an image having a later shooting date/time is laid out in the lower right portion of the template. Since the image 1005 for the main slot is newest, the templates of 3-1 to 3-4 shown in FIG. 10A are candidates. Since the older image 1006 for the sub-slot is a portrait image and the newer image 1007 for the sub-slot is a landscape image, the template of 3-2 is selected as a template optimum for the selected images.

Figure 14:
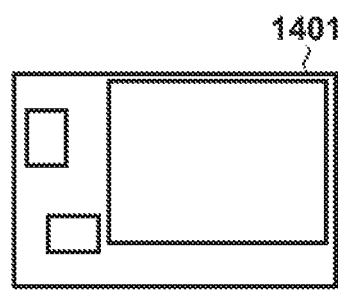
FIG. 14 is a view for explaining an image layout according to the present invention.

At this time, FIG. 14 shows an example of a template that matches the template of 3-2 in terms of the slot count and the orientations and positions of the respective slots and in which the size of the main slot is larger than that in the template of 3-2. A criterion to select an image for each slot is decided based on the shooting date/time order and orientations of the images. If a plurality of template candidates exist, a template is selected based on the difference between the scores of the respective images, which have been decided in step S413. For example, if the score of the main slot is greater than the average score of the plurality of sub-slots by an amount exceeding a predetermined threshold, a template 1401 including a larger main slot is selected. On the other hand, if the threshold is not exceeded, the template of 3-2 is selected. The score to be used for comparison may be the score for the main slot or the sub-slot.

In this step, information capable of identifying a specific image to be laid out in a specific slot of a specific template is decided. Note that if the slot count of the selected template does not match the number of selected images at this time, the user may select an excessive/lacking image. In this case, an image having a high score may be preferentially presented. Alternatively, among the remaining images classified into the same scene, an image having a high score may be automatically selected and laid out.

In step S423, the image correction condition input unit 213 obtains an input value indicating whether image correction is ON or OFF. In accordance with the input value, the image correction condition input unit 213 determines whether to perform image correction by the image correction unit 214. If image correction is to be performed (YES in step S423), the process advances to step S424. Otherwise (NO in step S423), the process advances to step S425.

In step S424, the image correction unit 214 executes image correction. If the image correction condition input unit 213 inputs the input value indicating ON, the image correction unit 214 executes image correction. As image correction, dodging correction, red-eye correction, and contrast correction are automatically executed. On the other hand, if the image correction condition input unit 213 inputs the input value indicating OFF, the image correction unit 214 executes no image correction. The image to be corrected has 1,200 pixels on a short side, and image correction is turned on/off for the image which has been converted into the sRGB color space. If ON/OFF is designated for each correction process, only the designated correction process may be executed.

In step S425, the layout information output unit 215 creates layout information. The decided images or the images having undergone image correction in step S424 are laid out in the slots of the template decided in step S422. At this time, the layout information output unit 215 resizes each image in accordance with the size information of each slot. The layout information output unit 215 generates bitmap data by laying out the images in the template.

In step S426, the page image analysis unit 216 determines whether the processes in steps S419 to S425 have ended for all the double page spreads. If it is determined that the processes have not ended (NO in step S426), the process returns to step S419. Otherwise (YES in step S426), the automatic layout processing ends.

As described above, in this embodiment, images assigned to each page are analyzed, the priority mode is automatically set, and images are selected for each page in accordance with the result. Note that a plurality of pages may be considered as one set to set the priority mode. For example, an album of twenty pages is divided into four scenes to add variations of introduction, development, turn, and conclusion to the album. Image analysis for each page is performed for each of the divided four scenes (each set of five pages), thereby setting the priority mode for each scene. That is, the priority mode may be set not for each page unit but for each unit of a plurality of pages. This arrangement can lay out images of the same subject not for each double page spread unit, but for each predetermined page unit including some double page spreads, thereby creating an album having variations of introduction, development, turn, and conclusion. At this time, the user may be able to designate a page unit. For example, the user may be able to set, via the display screen, whether the priority mode is set for each double page spread unit or each unit of a predetermined number of pages. If the priority mode is set for each unit of the predetermined number of pages, the user may be able to designate the number of pages.

In accordance with the set priority mode, the ordinal numbers of the double page spreads may be interchanged. In FIG. 15A, there are five double page spreads, the pet priority mode is automatically set for the first, second, and fourth pages and the person priority mode is automatically set for the third and fifth pages. In this case, the pages of the pet priority mode and the pages of the person priority mode are mixed in the overall album, and thus the album is not well organized. To solve this problem, the third and fourth pages are interchanged, as shown in FIG. 15B. This arrangement can arrange, in the first half of the album, the pages for which the pet priority mode is set, and arrange, in the second half of the album, the pages for which the person priority mode is set. As a result, the overall album is organized for each subject, and the user can enjoy viewing the album in which the images are arranged and laid out. Note that the page interchanging processing can be performed in the layout information creation processing in step S425. That is, since the priority mode information of each page can be obtained in the priority mode setting processing performed for each page in step S420, the pages are interchanged to be arranged for each priority mode in the layout information creation processing in step S425 after the image correction processing in step S424 ends.

In the method described in the first embodiment, image analysis is performed for each of the pages having undergone double page spread assignment, and the priority mode is set for each page. Images are selected in accordance with the set priority mode, thereby making it possible to create an album in which images each including a subject are arranged for each double page spread.

Second Embodiment

In the first embodiment, the priority mode is automatically set for each double page spread. In the second embodiment, a method in which the user manually sets the priority mode will be described. In FIGS. 4A and 4B described in the first embodiment, the images are analyzed for each of the pages having undergone the double page spread assignment processing in step S419, and the priority mode is set for each page in step S420. In the second embodiment, these two steps are manually performed.

Figure 16:
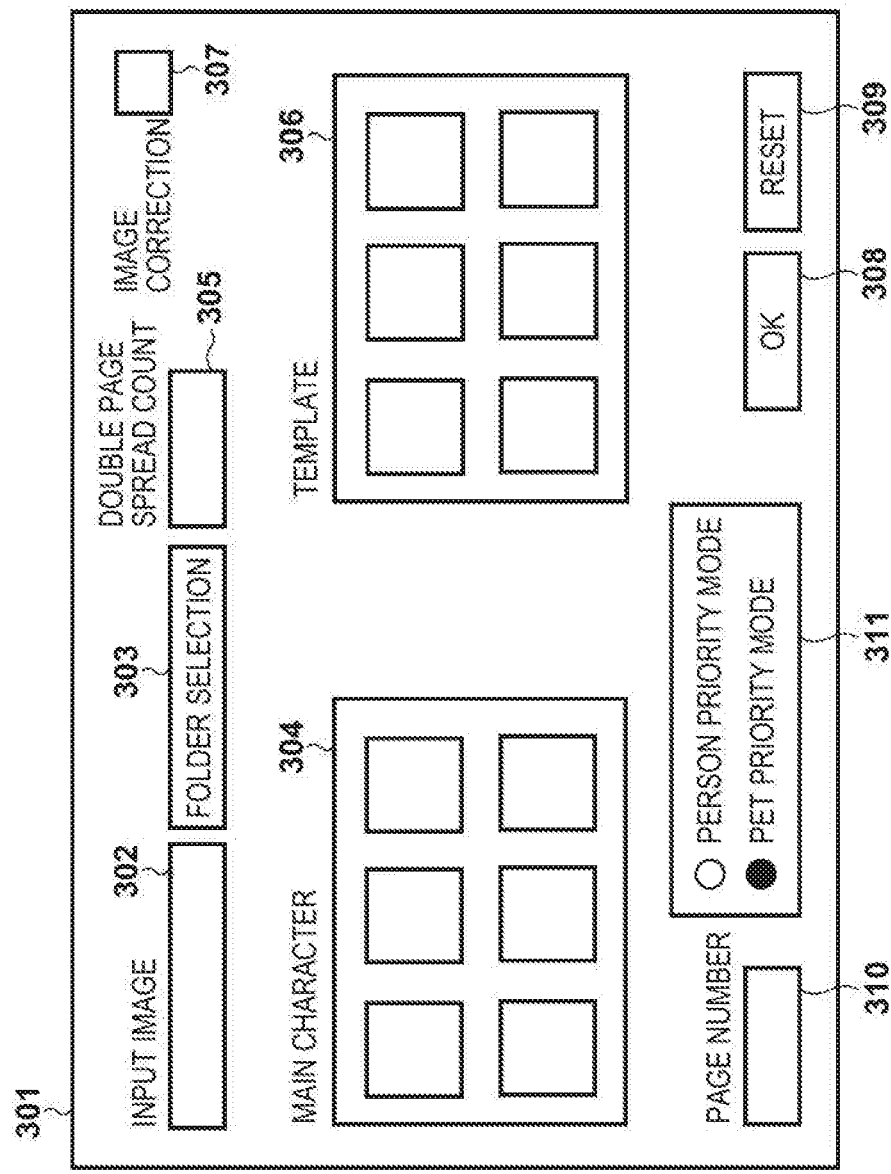
FIG. 16 is a view showing an example of the arrangement of the UI of an application according to the second embodiment.
Figure 17:
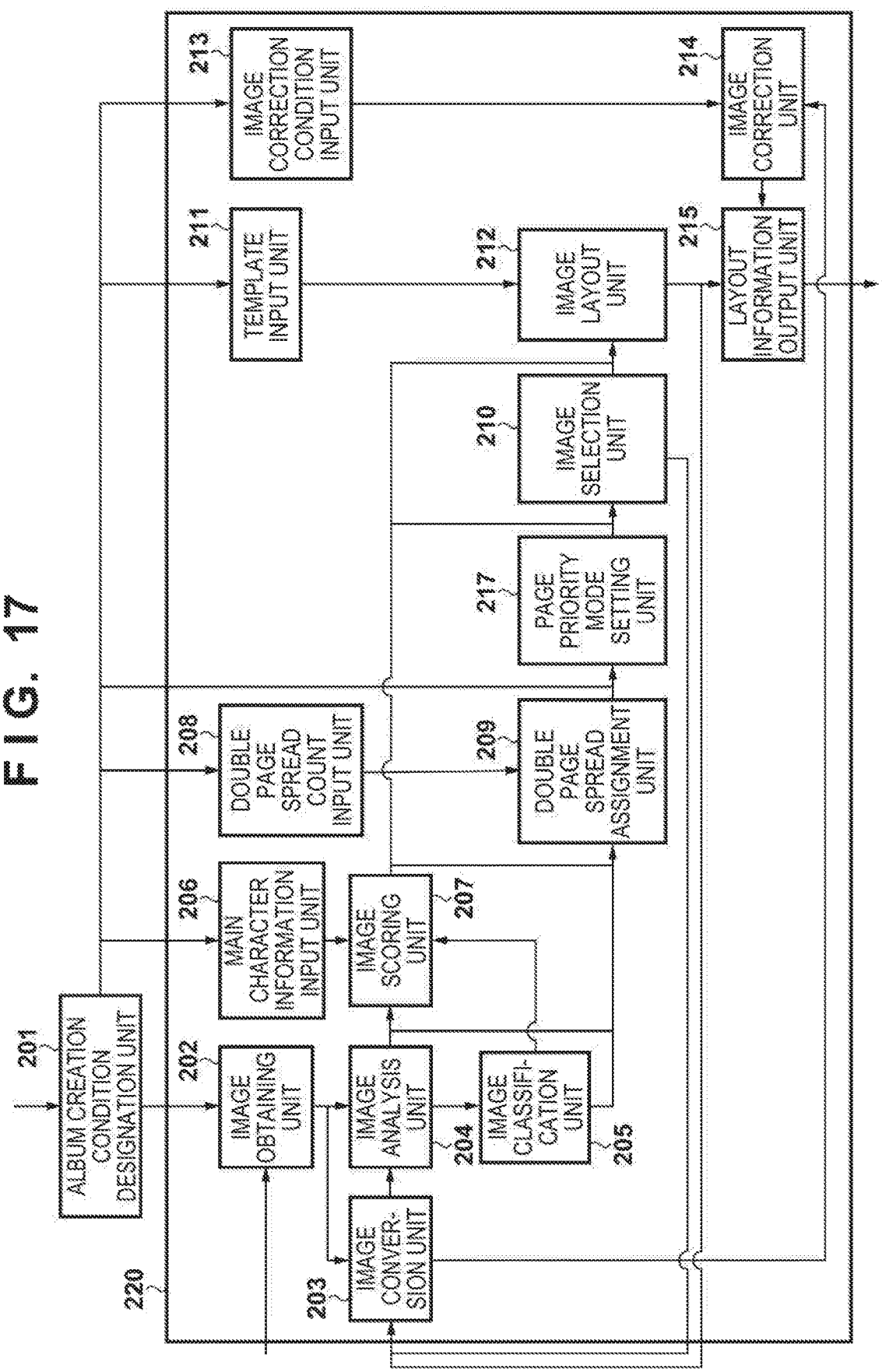
FIG. 17 is a block diagram showing an example of the software arrangement of the application according to the second embodiment.

FIG. 16 shows a display screen according to the second embodiment. The display screen according to this embodiment is different from that shown in FIG. 3 described in the first embodiment that a page number box 310 and priority mode selection buttons 311 are further provided. The user inputs, to the page number box 310, a page number for which the priority mode is to be selected. The input page number may be a page number for each page or a double page spread number. The priority mode selection buttons 311 are buttons each used to select the priority mode for the page designated in the page number box 310. FIG. 16 shows the person priority mode in which a person image is preferentially selected and the pet priority mode in which a pet image is preferentially selected. When one of the buttons is selected, the priority mode selected by an album creation condition designation unit 201 shown in FIG. 17 is set, and the information is sent to a page priority mode setting unit 217. That is, the arrangement shown in FIG. 17 is different from that shown in FIG. 2 described in the first embodiment that data is input from the album creation condition designation unit 201 to the page priority mode setting unit 217.

[Processing Procedure]

Figure 18A:
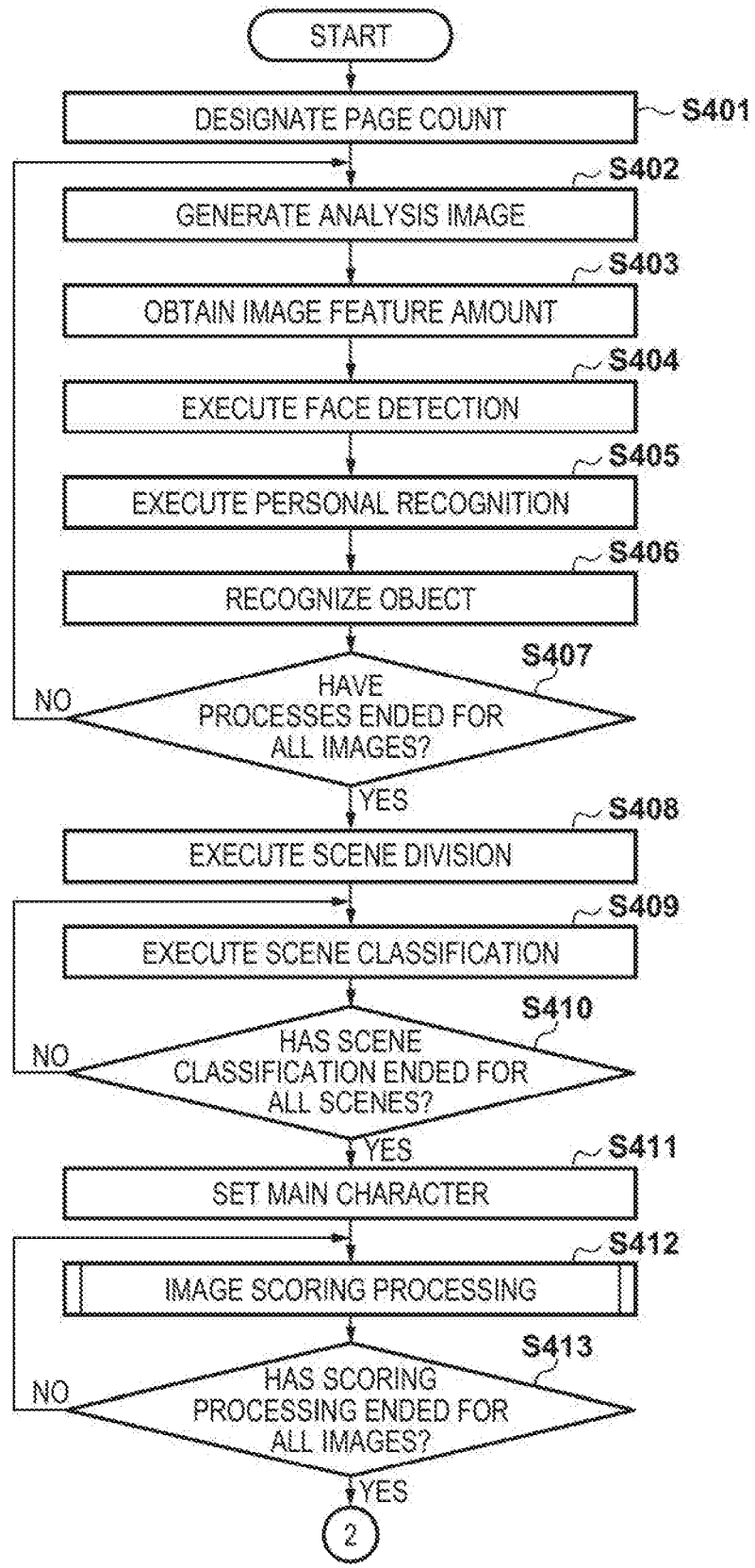
FIGS. 18A and 18B are flowcharts illustrating the procedure of automatic layout processing according to the second embodiment, in which a priority is set manually.
Figure 18B:
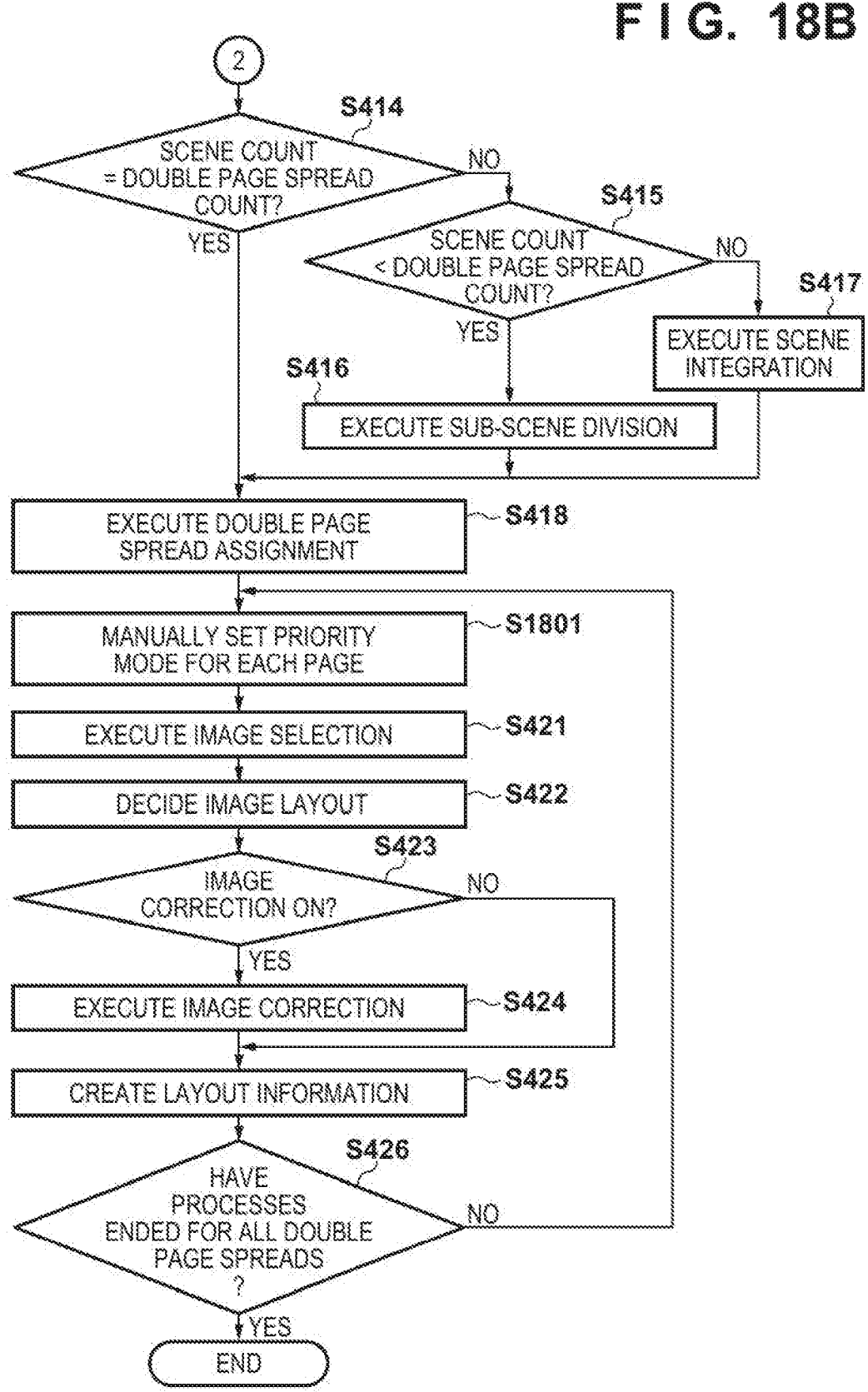

A processing procedure according to this embodiment will be described with reference to FIGS. 18A and 18B. Note that the same reference symbols denote the same processes as those shown in FIGS. 4A and 4B described in the first embodiment and a description thereof will be omitted. The processes in steps S401 to S418 immediately after the start of the processing are the same as those in the first embodiment. In the second embodiment, processing in step S1801 is performed instead of steps S419 and S420.

In step S1801, the album creation condition designation unit 201 accepts the setting of the priority mode from the user for each of all the pages having undergone double page spread assignment in step S418. Based on the setting result, an image selection unit 210 selects images for each page in step S421. At this time, the priority mode may be set for only some pages. In this case, for a page for which no priority mode is set, for example, the image selection unit 210 selects an image having a high score from the images having undergone double page spread assignment.

Figure 19A:
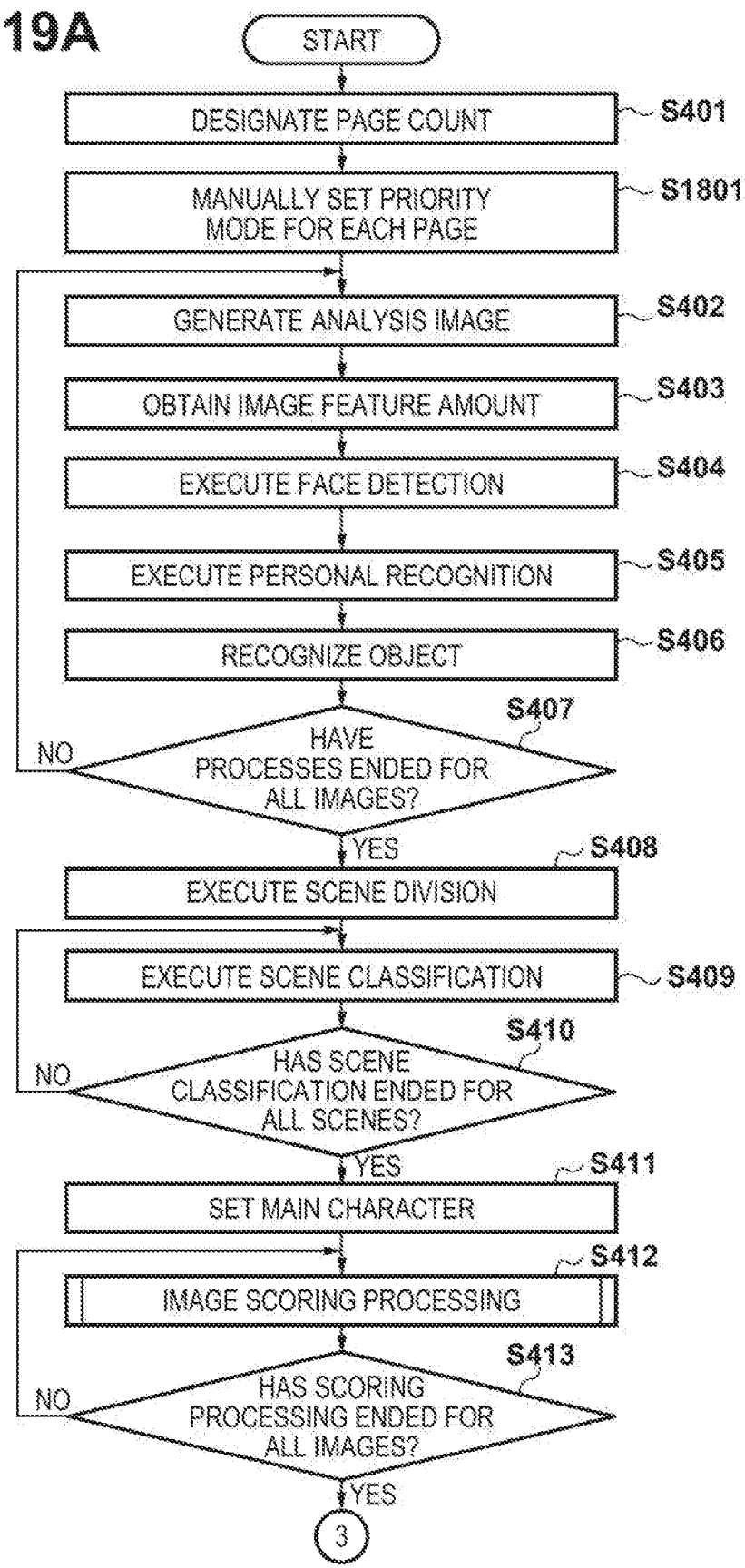
FIGS. 19A and 19B are flowcharts illustrating the procedure of automatic layout processing according to the second embodiment, in which a priority is set manually, but the order of setting priority is different from that shown in the embodiment of FIGS. 18A and 18B.
Figure 19B:
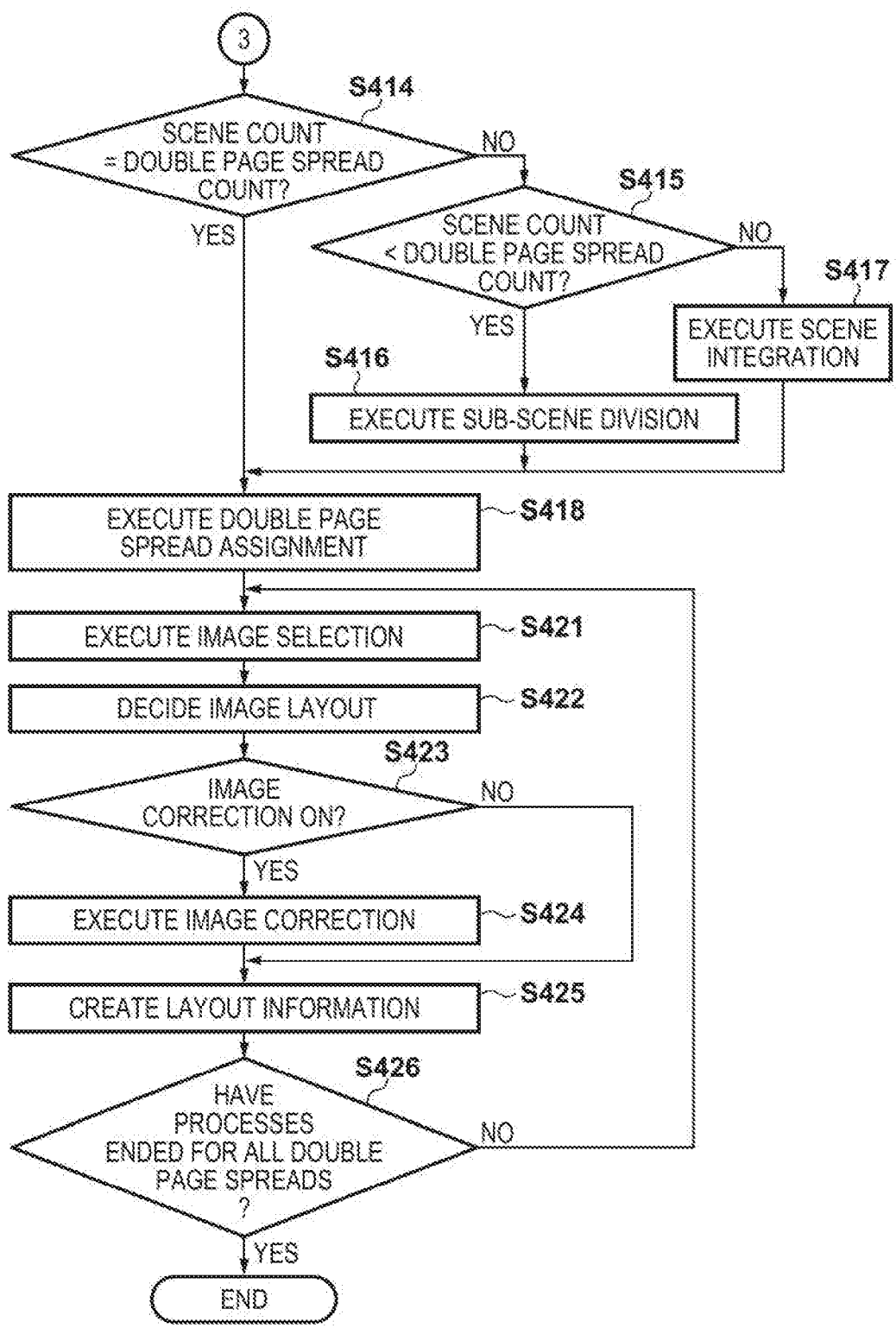

FIGS. 19A and 19B show a processing procedure of another arrangement according to this embodiment. FIGS. 19A and 19B show an arrangement in which step S1801 shown in FIG. 18A is performed immediately after step S401. That is, the user may manually set the priority mode immediately after the page count is designated in step S401.

If the user designates 20 pages as the page count of an album. In step S1801, the user sets, for example, the pet priority mode for the first to 10th pages and sets the person priority mode for the 11th to 20th pages. Image analysis is performed in steps S402 to S413 based on the set priority mode information, and then double page spread assignment is performed in step S418.

More specifically, the double page spread assignment processing in step S418 assigns pages so that the first to tenth pages include many pet images and the eleventh to twentieth pages include many person images. As an example, among the input image group, the distributions of the pet images and person images are checked in time series. If many pet images are included in the first half in time series and many person images are included in the second half, the image group is divided at a date/time when the distributions of the pet images and person images are switched. The images in the divided first half portion are used to create layouts of the first to tenth pages, and the images in the second half portion are used to create layouts of the eleventh to twentieth pages. At this time, if there is no pet image in the first half portion, a warning message indicating that it is impossible to create a layout since there is no pet image may be displayed on the display screen 301. Alternatively, the priority mode in which no image can be selected is not displayed.

Figure 20:
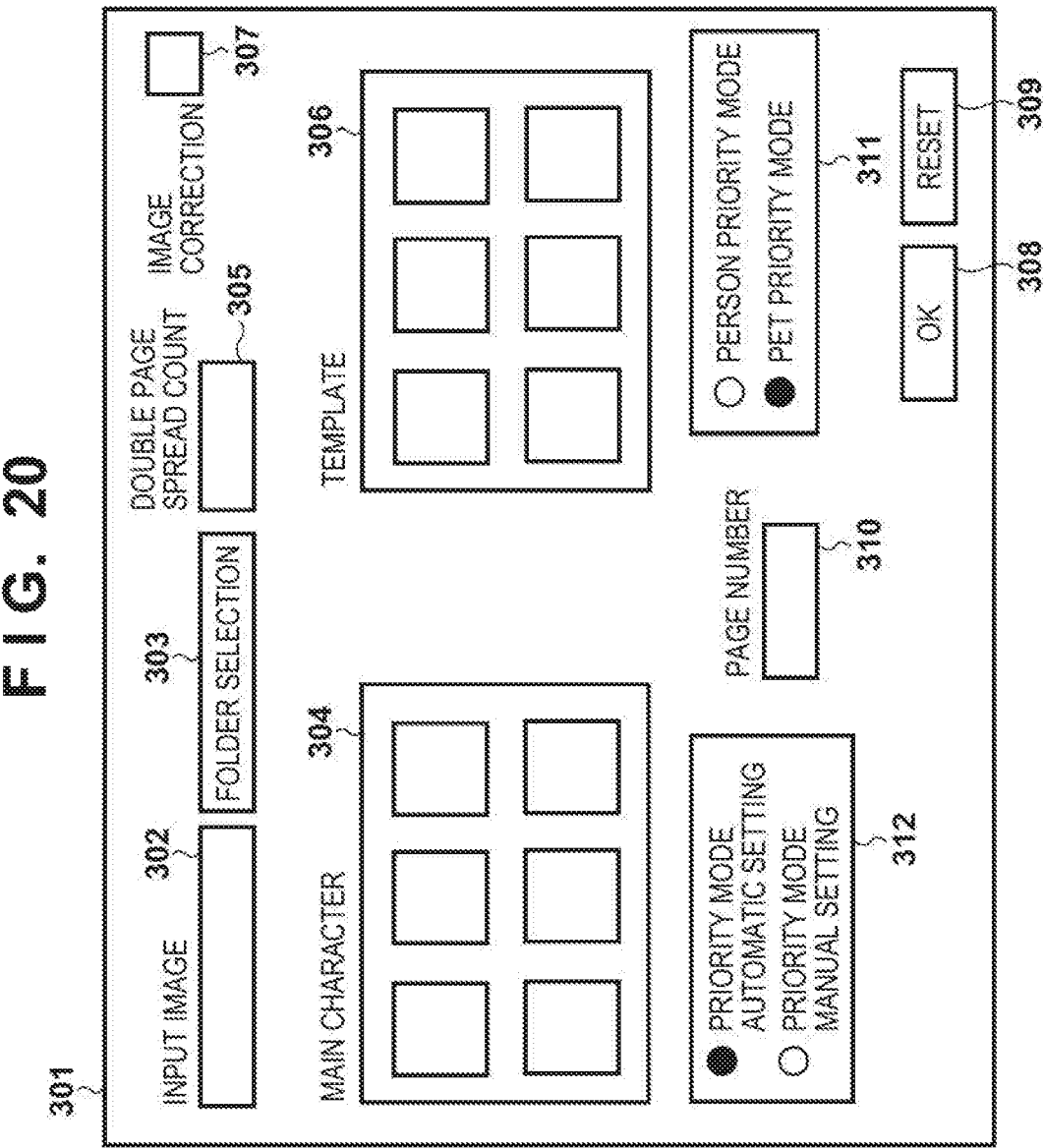
FIG. 20 is a view showing another example of the arrangement of the UI of the application according to the second embodiment.

As shown in FIG. 20, priority mode setting buttons 312 may be provided on the display screen. The priority mode setting buttons 312 are buttons used to set whether a specific priority mode for each page is set automatically or manually. If "priority mode automatic setting" is selected, the priority mode for each page is automatically set. On the other hand, if "priority mode manual setting" is selected, the user can set the priority mode for each page.

The arrangement according to the second embodiment allows the user to manually set the priority mode for each page. Images are selected in accordance with the set priority mode, thereby making it possible to create an album in which images each including a subject are arranged for each double page spread.

OTHER EMBODIMENTS

This embodiment has explained the example in which the album creation application is assumed. Image evaluation processing for selecting/displaying appropriate images from shooting scenes in an image group may be adopted.

The present invention is not limited to implementation in a standalone personal computer, a game machine, or the like.

For example, the same arrangement may be implemented on a smart device which can be carried. For example, the present invention may implement the same arrangement by using an image saved in a server or uploading an image.

Embodiment(s) of the present invention can also be realized by a computer of a system or an apparatus that reads out and executes computer executable instructions (e.g., one or more programs) recorded on a storage medium (which may also be referred to more fully as ('non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an obtaining unit configured to obtain a plurality of images;
a setting unit configured to set a first priority mode for a first page if the number of images including an object corresponding to the first priority mode among a plurality of images assigned to a first page is greater than the number of images including an object corresponding to the second priority mode among the plurality of images and set a second priority mode for a second page if the number of images including the object corresponding to the first priority mode among a plurality of images assigned to the second page is less than the number of images including the object corresponding to the second priority mode among the plurality of images; and
a selection unit configured to select an image including an object corresponding to the first priority mode for the first page from the plurality of images and to select an image including an object corresponding to the second priority mode for the second page from the plurality of images, in accordance with a priority mode set by the setting unit,
wherein the obtaining unit, the setting unit and the selection unit are implemented by at least one processor of the image processing apparatus.

2. The apparatus according to claim 1, further comprising:
a division unit configured to divide a plurality of images into a first image group and a second image group,
wherein the first priority mode is set for the first page by analyzing the first image group assigned to the first page, and the second priority mode is set for the second page by analyzing the second image group assigned to the second page, and
wherein the division unit is implemented by at least one processor of the image processing apparatus.

3. The apparatus according to claim 1, further comprising a display control unit configured to display a screen that accepts, from a user, the setting of the priority mode for each of the first page and the second page, wherein the display control unit is implemented by at least one processor of the image processing apparatus.

4. The apparatus according to claim 3, further comprising:
a division unit configured to divide a plurality of images into a plurality of image groups and to assign the image groups to respective page units,
wherein, in accordance with a priority mode for each page unit set by the user via the screen, an image is selected from the image group assigned to the page unit, and
wherein the division unit is implemented by at least one processor of the image processing apparatus.

5. The apparatus according to claim 3, wherein a plurality of priority modes are provided in correspondence with types of objects included in the images, and
the screen is displayed so that the user cannot select a priority mode corresponding to an object not included in an image group assigned to a page unit.

6. The apparatus according to claim 1, wherein a plurality of priority modes are provided in correspondence with types of objects included in the images, and a priority mode for a page unit is set in accordance with the number of types of objects included in an image group assigned to the page unit.

7. The apparatus according to claim 1, wherein the first priority mode is a mode in which an image including a person is prioritized and the second priority mode is a mode in which an image including a predetermined object, different from the person, is prioritized.

8. The apparatus according to claim 1, further comprising a unit configured to rearrange page units in accordance with the priority mode set for each page unit by the setting unit, wherein the unit is implemented by at least one processor of the image processing apparatus.

9. The apparatus according to claim 1, wherein the page is a double page spread of a book.

10. An image processing method comprising:
obtaining a plurality of images;
setting a first priority mode for a first page if the number of images including an object corresponding to the first priority mode among a plurality of images assigned to a first page is greater than the number of images including an object corresponding to the second priority mode among the plurality of images and setting a second priority mode for a second page if the number of images including the object corresponding to the first priority mode among a plurality of images assigned to the second page is less than the number of images including the object corresponding to the second priority mode among the plurality of images; and
selecting an image including an object corresponding to the first priority mode for the first page from the plurality of images and selecting an image including an object corresponding to the second priority mode for the second page from the plurality of images, in accordance with a priority mode set in the setting.

11. The method according to claim 10, further comprising dividing a plurality of images into a first image group and a second image group, wherein the first priority mode is set for the first page by analyzing the first image group assigned to the first page, and the second priority mode is set for the second page by analyzing the second image group assigned to the second page.

12. The method according to claim 10, further comprising displaying a screen that accepts, from a user, the setting of the priority mode for each of the first page and the second page.

13. The method according to claim 12, further comprising dividing a plurality of images into a plurality of image groups and assigning the image groups to respective page units, wherein, in accordance with a priority mode for each page unit set by the user via the screen, an image is selected from the image group assigned to the page unit.

14. The method according to claim 12, wherein a plurality of priority modes are provided in correspondence with types of objects included in the images, and the screen is displayed so the user cannot select a priority mode corresponding to an object not included in an image group assigned to a page unit.

15. The method according to claim 10, wherein a plurality of priority modes are provided in correspondence with types of objects included in the images, and a priority mode for a page unit is set in accordance with the number of types of objects included in an image group assigned to the page unit.

16. The method according to claim 10, wherein the first priority mode is a mode in which an image including a person is prioritized and the second priority mode is a mode in which an image including a predetermined object, different from the person, is prioritized.

17. The method according to claim 10, further comprising rearranging page units in accordance with the priority mode set for each page unit in the setting.

18. The method according to claim 10, wherein the page is a double page spread of a book.

* * * * *